United States Patent [19]
Grosswiller et al.

[11] Patent Number: 5,131,792
[45] Date of Patent: Jul. 21, 1992

[54] PNEUMATIC TUBE SYSTEM

[75] Inventors: Leo J. Grosswiller, East Canton; F. Michael Theriault, Canton; Laurence F. Mannella; Walter G. Anders, both of North Canton, all of Ohio

[73] Assignee: Diebold, Incorporated, Canton, Ohio

[21] Appl. No.: 621,015

[22] Filed: Nov. 30, 1990

[51] Int. Cl.$^5$ ............. B65G 51/30; B65G 51/26; B65G 51/06
[52] U.S. Cl. ................. 406/112; 406/111; 406/176; 406/187
[58] Field of Search ............ 406/111.28, 112, 176, 406/187, 147

[56] References Cited

U.S. PATENT DOCUMENTS

| Re. 30,882 | 3/1982 | Leavelle . | |
|---|---|---|---|
| 556,417 | 3/1896 | Hoppner et al. . | |
| 673,725 | 5/1901 | Pearsall . | |
| 947,714 | 1/1910 | Leclair | 292/302 |
| 1,265,869 | 5/1918 | Arkin | 24/657 |
| 1,271,650 | 7/1918 | Arkin | 24/657 |
| 1,275,357 | 8/1918 | Arkin | 24/211 |
| 1,305,979 | 6/1919 | Cobe | 24/657 |
| 1,618,730 | 2/1927 | Ricker | 292/302 |
| 1,892,743 | 1/1933 | Wenger . | |
| 2,535,275 | 12/1950 | Dixon | 220/326 |
| 2,736,513 | 2/1956 | Aman et al. | 243/39 |
| 2,866,574 | 12/1958 | Roumeliotis | 220/326 |
| 2,912,066 | 11/1959 | Ellithorpe | 186/1 |
| 3,189,297 | 6/1965 | Ellithorpe . | |
| 3,237,881 | 3/1966 | Grosswiller . | |
| 3,266,751 | 8/1966 | Purdy, et al. . | |
| 3,343,709 | 9/1967 | Henderson . | |
| 3,419,229 | 12/1968 | Crosby . | |
| 3,561,591 | 2/1971 | Henderson . | |
| 3,601,337 | 8/1971 | Bullock . | |
| 3,610,554 | 10/1971 | Schwarz et al. | 243/19 |
| 3,612,438 | 10/1971 | Herndon . | |
| 3,642,232 | 2/1972 | Kelley . | |
| 3,655,146 | 4/1972 | Woll . | |
| 3,690,593 | 9/1972 | Kettering | 243/34 |
| 3,788,577 | 1/1974 | Barnett et al. . | |
| 3,790,102 | 2/1974 | Tearne et al. | 243/19 |
| 3,841,584 | 10/1974 | Robinson et al. | 243/19 |
| 3,940,091 | 2/1976 | Ekama et al. . | |
| 3,961,721 | 6/1976 | Gordon et al. . | |
| 3,976,264 | 8/1976 | Ekama et al. | 243/19 |
| 4,004,753 | 1/1977 | Thomas et al. | 243/19 |
| 4,059,246 | 11/1977 | Anders et al. . | |
| 4,084,149 | 4/1978 | Driver et al. . | |
| 4,135,684 | 1/1979 | Willey | 243/19 |
| 4,180,354 | 12/1979 | Greene . | |
| 4,189,260 | 2/1980 | Morano et al. | 406/76 |
| 4,189,261 | 2/1980 | Kelley et al. . | |
| 4,273,478 | 6/1981 | Cedergreen . | |
| 4,315,704 | 2/1982 | Kelley et al. . | |
| 4,325,660 | 4/1982 | Jones . | |
| 4,339,098 | 7/1982 | Tardot et al. | 244/151 |
| 4,343,574 | 8/1982 | Anders | 406/13 |
| 4,352,603 | 10/1982 | Anders | 406/27 |
| 4,362,443 | 12/1982 | Mallory . | |
| 4,395,164 | 7/1983 | Beltrop et al. . | |
| 4,462,721 | 7/1984 | Anders et al. | 406/112 |
| 4,466,761 | 8/1984 | Beltrop et al. . | |

(List continued on next page.)

FOREIGN PATENT DOCUMENTS 1481428 1/1969 Fed. Rep. of Germany .
2131052 1/1973 Fed. Rep. of Germany .

Primary Examiner—Margaret A. Focarino
Assistant Examiner—James M. Kannofsky
Attorney, Agent, or Firm—D. Peter Hochberg; Mark Kusner; Louis J. Weisz

[57] ABSTRACT

A pneumatic tube system comprising: a pair of terminals; an overhead cylindrical tube connecting the terminals; a captive carrier for passage through the tube, the carrier having an internal cavity for carrying articles and removable caps at the distal ends thereof enclosing the cavity; a carrier receiver enclosed within each of the terminals for receiving the carrier, the carrier receiver being operable to reciprocally move the carrier axially along a pre-determined axis which is angularly movable relative to the tube; and a cap removing assembly in each of the terminals operable to remove a cap from one end of the carrier to permit access to the carrier cavity and to replace the cap to permit transfer of the carrier through the tube.

24 Claims, 16 Drawing Sheets

U.S. PATENT DOCUMENTS

| | | |
|---|---|---|
| 4,512,688 | 4/1985 | Hochradel . |
| 4,568,225 | 2/1986 | Alexandrov et al. . |
| 4,620,577 | 11/1986 | Nordenswan . |
| 4,676,393 | 6/1987 | Daniel . |
| 4,715,750 | 12/1987 | Podoll et al. . |
| 4,735,289 | 4/1988 | Kenyon . |
| 4,740,020 | 4/1988 | Williams ............................. 292/41 |
| 4,792,263 | 12/1988 | Podell et al. . |
| 4,820,086 | 4/1989 | Kieronski . |
| 4,941,777 | 7/1990 | Kieronski ............................. 406/13 |

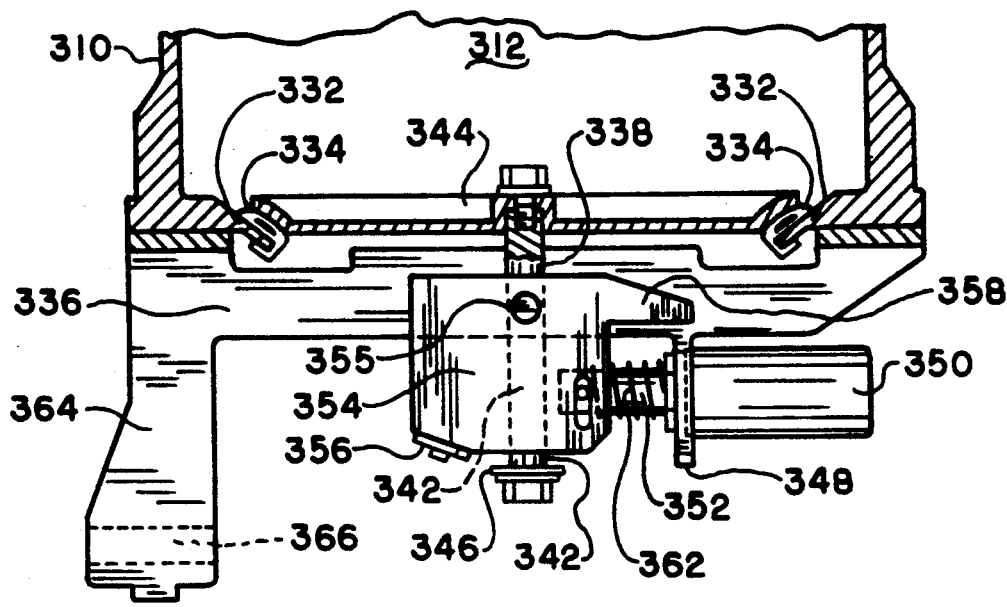
FIG. 16A
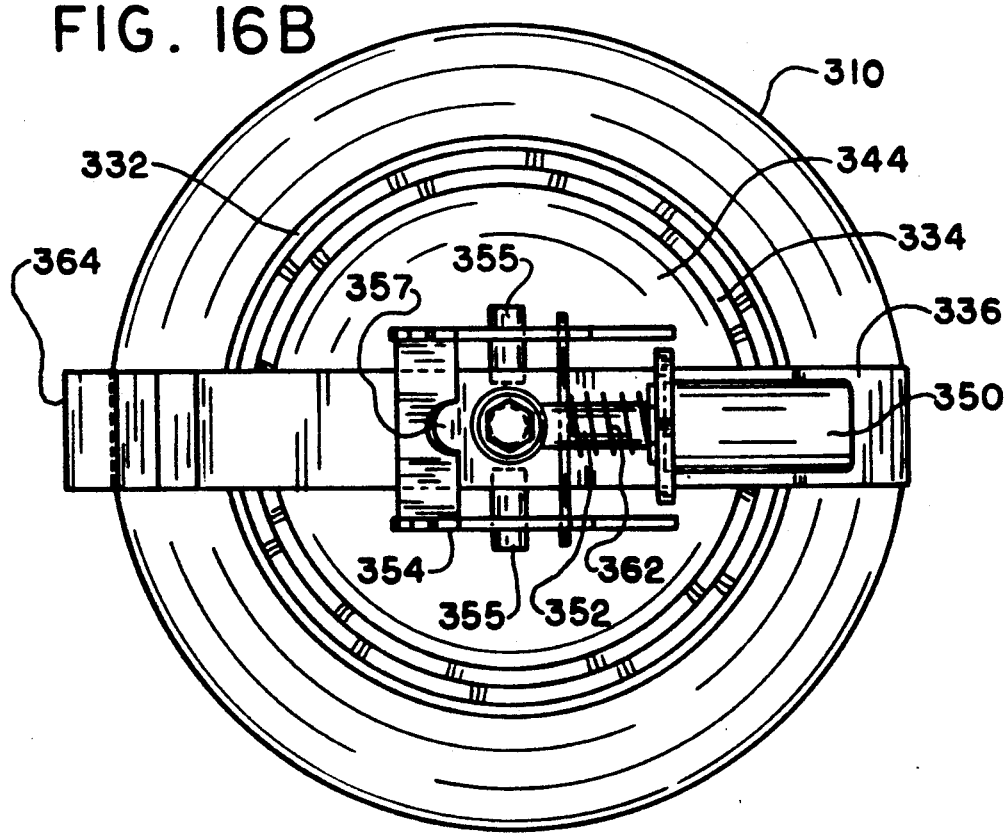

PNEUMATIC TUBE SYSTEM

FIELD OF THE INVENTION

The present invention relates generally to a system for transferring articles between two locations, and more particularly to a pneumatic tube system for conveying articles in a carrier through a tube between two terminals. The present invention is applicable to banking operations in which a carrier is transferred through a tube between a customer terminal and a teller terminal and will be described with particular reference thereto. The present invention however, is not limited to banking operations and may find advantageous application in other operations wherein it is desirable to transfer objects between two locations.

BACKGROUNF OF THE INVENTION

As a service to its customers, most banking establishments have historically offered drive-up services whereby a customer can conduct financial transactions from a car or van at a teller drive-up window generally located on an accessible external wall of the bank building. With the advent and success of automatic teller machines (ATMs), it has become more desirable to utilize wall space previously dedicated to drive-up teller windows for ATM usage. One reason for this is that drive-up ATM terminals are more profitable and more convenient in that they can provide generally unattended, around the clock service to bank customers. While the very nature of an ATM permits positioning of such machines in locations remote from the bank proper, for reasons of security, as well as operator convenience, ATMs are normally placed through a wall of an existing building wherein the face of the ATM is exterior to the building and accessible to a customer and where the machine itself and its internal cash reserves are located within the building where it is protected from criminal tampering and easily accessible by authorized personnel for service and/or resupply of cash.

As a result of the foregoing, banking institutions prefer to dedicate accessible external wall space for drive-up lanes for ATM usage. Nevertheless, such institutions still desire to accommodate drive-up customers who need to conduct financial transactions which cannot be performed by ATMs.

With the assignment of external wall space to ATM traffic, the interest in transfer systems which would communicate a bank teller with a remote location has increased. One type of transfer system gaining increased acceptance for remote banking applications is pneumatic transfer systems in which a carrier for holding articles is transferred through a tube from the teller to a customer remote therefrom.

Pneumatic tube banking systems in present day use are generally of two types, i.e. (1) captive carrier systems and (2) non-captive carrier systems. Non-captive carrier systems are ones in which the carrier may be removed from the system to insert or remove articles. Important in any pneumatic tube system for use in banking operations is that it be user friendly and at the same time simple to use. It is likewise desirable to provide a system having a large content capacity, which at the same time requires little ground space, i.e. has a small profile. In this respect, it is important that the system have sufficient capacity for commercial or business transactions typically involving deposits of large quantities of coins, bills, checks and the like. Due to this latter requirement, captive systems are generally required for any system intended to replace a drive-up teller window, because larger loads necessitate larger carriers and as the carrier size increases, its weight and size makes use of a removable carrier impractical for general customer usage.

U.S. Pat. No. 4,715,750 to Podoll, et al. discloses an overhead pneumatic tube system designed for banking operations. The foregoing patent discloses a system utilizing a rectangular tube and carrier for transporting relatively large loads. While the disclosed system has generally proven successful in commercial operation, use of a rectangular tube makes fabrication and installation of such a system more difficult as compared to cylindrical systems. In this respect, it is generally believed that cylindrical tubes are more efficient, in that it is easier to maintain a uniform passage through a cylindrical tube as compared to a rectangular tube which tends to "neck down" at the mid section of its sides when under a vacuum. Such tendency together with the difficulty of providing a seal around a rectangular carrier as compared to a cylindrical carrier makes the fabrication and installation of a rectangular tube more difficult and less flexible in its application.

With respect to large, captive cylindrical carriers, as indicated in the foregoing patent, it was heretofore believed that a cylindrical carrier was not suitable or efficient for transport of large, heavy loads, it being believed that access to the interior of a cylindrical carrier was difficult and impractical in large captive systems.

The present invention overcomes the perceived difficulties and deficiencies of large, carrier systems and provides a pneumatic tube system which employs a large, carrier capable of transporting relatively large loads, which system includes compact, reliable and easy to use.

SUMMARY OF THE INVENTION

In accordance with the present invention, there is a provided a pneumatic tube system comprised of a pair of terminals connected by an overhead tube. A carrier having a removable cap on at least one end thereof is provided for passage through the tube. At least one of said terminals includes carrier receiving means for receiving the carrier, which receiving means is operable to reciprocally move the carrier axially along a pre-determined axis, which pre-determined axis is angularly movable relative to the tube. Cap removing means are provided within the terminal, operable to remove and retain the cap within the terminal.

In accordance with another aspect of the present invention, there is provided a system as described above wherein a terminal having carrier receiving means also includes sensing means operable to detect objects, such as vehicles, in the vicinity thereof, and control means responsive to the sensing means for controlling the orientation of the angularly movable axis and the position of the carrier receiving means along such axis.

In accordance with another aspect of the present invention there is provided a carrier for use in a cylindrical pneumatic tube system comprised of a generally cylindrical box, a tubular body defining an interior cavity for holding the articles to be transferred and a pair of essentially identical removable caps dimensioned to be mounted on the distal ends of the body. Each cap includes a disk shaped cover dimensioned to correspond to an open end of the carrier body and a plurality of latch elements operable to grip the end of the carrier body. The latch elements are movable along individual paths between an attached position wherein the latch elements grip the carrier body and a released position wherein the latch elements are disengaged from the carrier body wherein the cover may be removed from the carrier. The cap includes an actuator movable between a first position and a second position and link means operable to connect the actuator to the plurality of latch elements, the latch elements being in the attached position when the actuator is in its first position and being in the release position when the actuator is in its second position. Biassing means bias the actuator toward its first position.

In accordance with another aspect of the present invention, there is provided a cap for enclosing a generally tubular container having a cavity, an opening into the cavity and a flange about the periphery of the opening. The cap includes a cap housing dimensioned to generally correspond to the opening in the container. A plurality of latch elements are mounted to the housing, each of the latch elements including a hook shaped protrusion dimensioned to engage the flange of the container. The latch elements are reciprocally movable along an individual path which is generally perpendicular to a pre-determined axis between an attached position wherein the hook shaped projections are disposed to engage and grip the flange on the container and a second position wherein the latch elements have moved outward away from the axis and the hook shaped projections are removed from the flange. An actuator movable along the axis between a first position and a second position is provided together with link means operable to connect the actuator to the plurality of latch elements. The latch element is in the attached position when the actuator is in the first position and is in the release position when the actuator is in the second position.

It is an object of the present invention to provide a point-to-point pneumatic transfer system for moving heavy loads.

Another object of the present invention is to provide a pneumatic transfer system as described above which maximizes the efficiency of a cylindrical carrier.

Another object of the present invention is to provide a pneumatic transfer system as described above which is compact and particularly applicable as a banking system for a teller-to-customer transfer operation.

Another object of the present invention is to provide a pneumatic transfer system as described above which employs a cylindrical captive carrier in a compact, efficient system.

Another object of the present invention is to provide a pneumatic transfer system as described above wherein the teller terminal and customer terminal are essentially identical.

Another object of the present invention is to provide a pneumatic transfer system as described above which is comprised of a single cylindrical tube utilizing a captive cylindrical carrier having removable caps at both ends.

Another object of the present invention is to provide a pneumatic transfer system as described above which automatically removes the caps from one end of the carrier and presents an open carrier to the customer or teller.

Another object of the present invention is to provide a pneumatic transfer system as described above herein the carrier is reciprocally movable axially along a path which is angular movable relative to the transfer tube.

A still further object of the present invention is to provide a pneumatic transfer system as described above for use as a drive-up banking system, which system includes sensors to sense the type of vehicle present at the customer terminal and to present an open carrier to the vehicle at a convenient position.

A still further object of the present invention is to provide a pneumatic transfer system as described above, including means for modifying the position of the carrier when presented to the customer.

A still further object of the present invention is to provide a pneumatic transfer system as described above having a cap removal system wherein a cap removed from the carrier is maintained generally within the carrier tube.

A still further object of the present invention is to provide a pneumatic transfer system as described above, including sensing means for sensing internal operating parameters and adjusting the position of the carrier within the terminal to compensate for sensed misalignments.

A still further object of the present invention is to provide a pneumatic transfer system as described above having safety provisions to minimize the likelihood of injury to a customer or teller.

An even further object of the present invention is to provide a carrier for use in a pneumatic transfer system which carrier includes removable caps having radial latching elements for gripping the peripheral edge of the carrier.

An even further object of the present invention is to provide a carrier as described above wherein the latching elements are radially movable between an attached position wherein the cap is secured to the carrier, and a release position wherein the cap may be removed from the carrier.

These and other objects and advantages will become apparent from the following description of a preferred embodiment of the invention taken together with the accompanying drawings.

BRIEF DESCRIPTION OF THE DRAWINGS

The invention may take physical form in certain parts and arrangement of parts, a preferred embodiment of which will described in detail in the specification and illustrated in the accompanying drawings which form a part hereof and wherein:

FIGS. 16A and 16B are enlarged views of a locking element forming one part of the present invention.

DETAILED DESCRIPTION OF THE PREFERRED EMBODIMENT

The System

Figure 1:
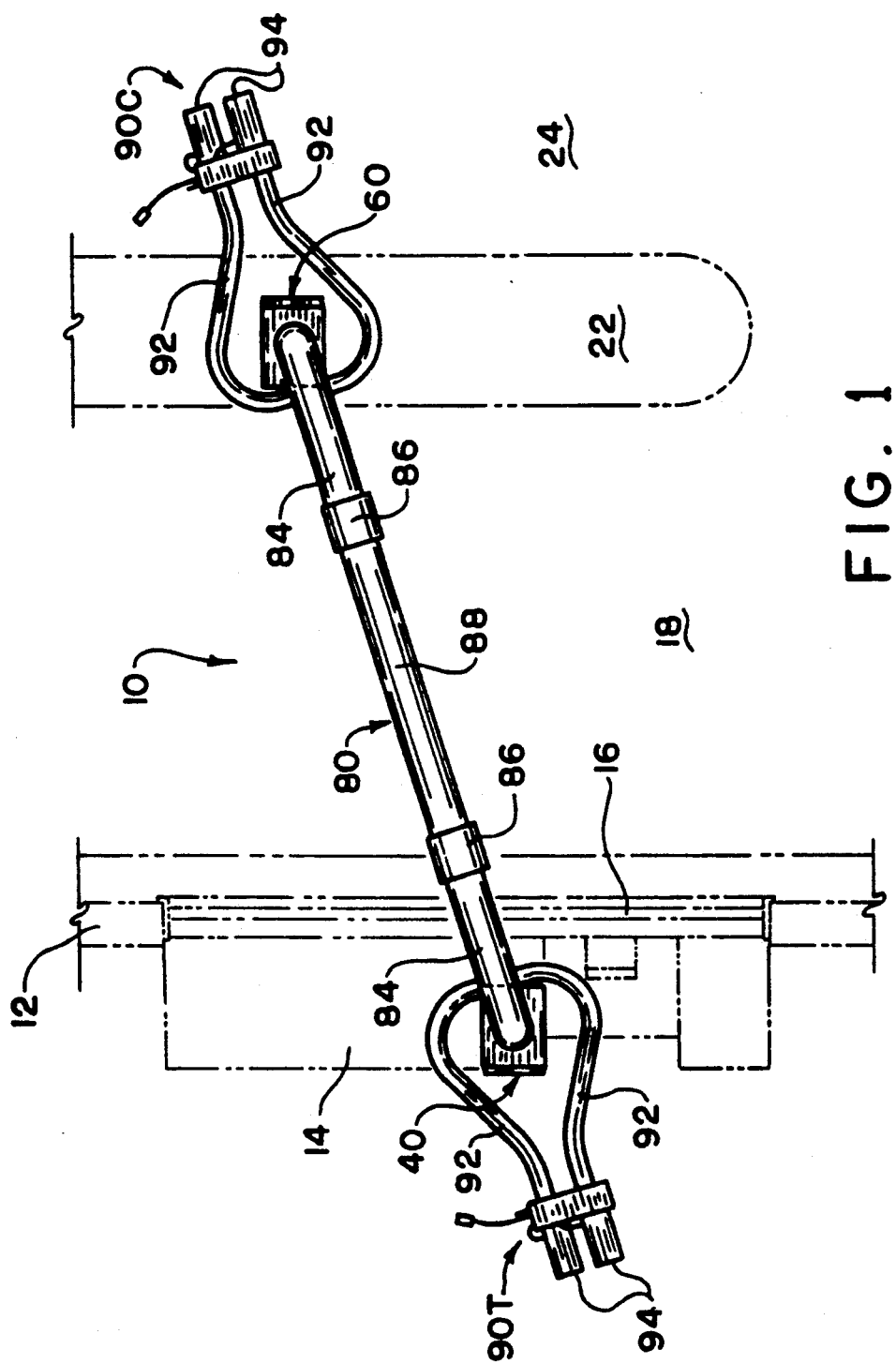
FIG. 1 is a plan view of a pneumatic transfer system for use in a banking operation illustrating a preferred embodiment of the present invention.
Figure 2A:
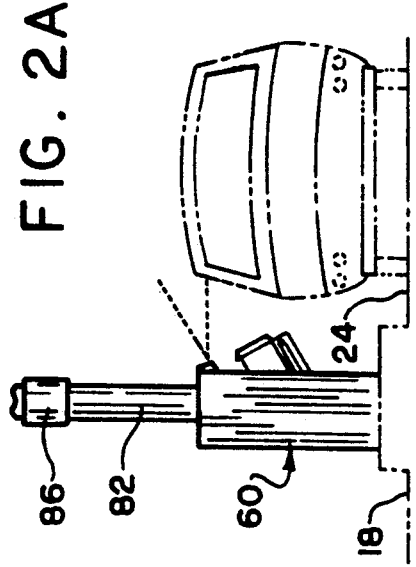
FIGS. 2A and 2B are views of a customer terminal illustrating aspects of operation of the pneumatic transfer system shown in FIGS. 1 and 2.
Figure 2B:
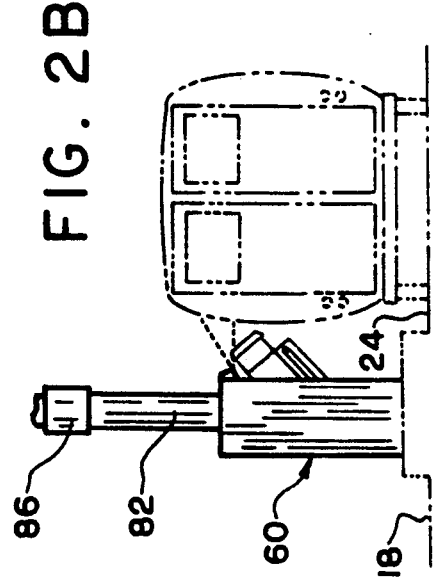
Figure 2:
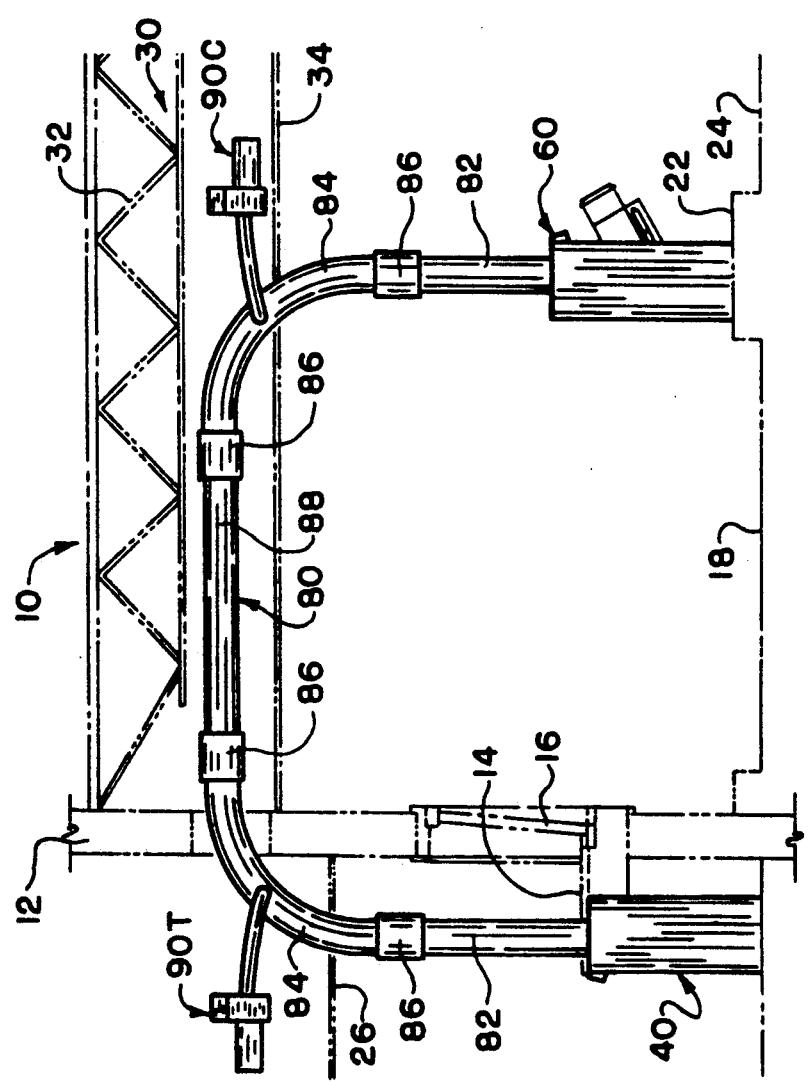
FIG. 2 is a side elevational view of the pneumatic transfer system shown in FIG. 1.

Referring now the drawings wherein the showings are for the purpose of illustrating the preferred embodiment of the invention only, and not for the purpose of limiting same, FIGS. 1 and 2 show a point-to-point pneumatic transfer system 10 according to the present invention for use in a banking operation. System 10 is basically comprised of a teller terminal 40 and a customer terminal 60, which are connected by an overhead cylindrical transfer tube 80 dimensioned to receive a cylindrical carrier 100 (shown in FIG. 3).

In the embodiment shown, teller terminal 40 is positioned within a teller building 12 at a teller station 14 having a window 16 which provides a view out across a first vehicle lane 18 to customer terminal 60. Customer terminal 60 is mounted on an island 22 which defines a second vehicle lane 24 and which island 22 elevates customer terminal 60 a predetermined distance above the surface of vehicle lanes 18 and 24. In the embodiment shown, transfer tube 80 is generally comprised of a plurality of tube sections 82, 84 and 88. As best seen in FIG. 2, a straight tube section 82 extends generally vertically upward from teller terminal 40. Vertical section 82 is connected to a curved elbow 84 by means of a tube connection clamp 86. In the embodiment shown, curved section 84 extends through ceiling 26 of teller building 12 and through an opening into a shelter designated 30. Shelter 30 which extends over vehicle lanes 18 and 24, includes a truss 32 which is provided to support a false ceiling 34 by conventional means (not shown). Curved elbow 84 communicates with horizontal tube section 88 which is disposed above false ceiling 34. Horizontal tube section 88 communicates with a second curved elbow section 84 which in turn is connected to a second vertical tube section 82. This vertical tube section 82 communicates with customer terminal 60. Each of the tube sections is fastened to an adjacent section by a tube connection clamp 86. Tube sections 82, 84 and 88 are connected to each other in a manner to insure a smooth, continuous inner cylindrical passageway, designated "P" in the drawings. Tube sections 82, 84 and 88 are preferably supported from truss 32 by conventional support rods (not shown).

Transfer tube 80 (i.e. tube sections 82, 84 and 88) may be formed from metal or plastic, and with respect to the latter, may be transparent or opaque. In the embodiment disclosed in the present specification, transfer tube 80 is formed of commercially available metal tubing having a nominal 8" outer diameter. As will be appreciated from a further reading and understanding of this specification and the disclosed embodiment, the present invention is not limited to a specific commercially available tube size, and in this respect, plastic tubing larger than 8" may be formed and find advantageous application with the present invention.

A pair of exhaust blower assemblies 90T and 90C, shown in FIGS. 1 and 2, are provided above terminals 40 and 60 respectively to exhaust air from transfer tube 80 via flexible tubing 92 connected curved tube sections 84. Blower assemblies 90T and 90C may be supported from truss 32 by conventional means (not shown). Blower assemblies 90T and 90C in and of themselves form no part of the present invention and therefore shall not be described in great detail. Basically, blower assemblies 90T and 90C are identical and each assembly is comprised of side-by-side blowers 94 electrically connected for simultaneous operation. Each blower 94 includes an in-line flap valve (not shown) which permits movement of air in the exhaust direction only. In the embodiment shown, blowers 94 are two stage blowers (i.e. having two compression fans) manufactured by Ametek Inc., Lamb Electric Division of Kent, Ohio, capable of moving approximately 125 cubic feet of air per minute. Operation of blower assemblies 90T, 90C shall be described in greater detail below.

The Carrier

Figure 3:
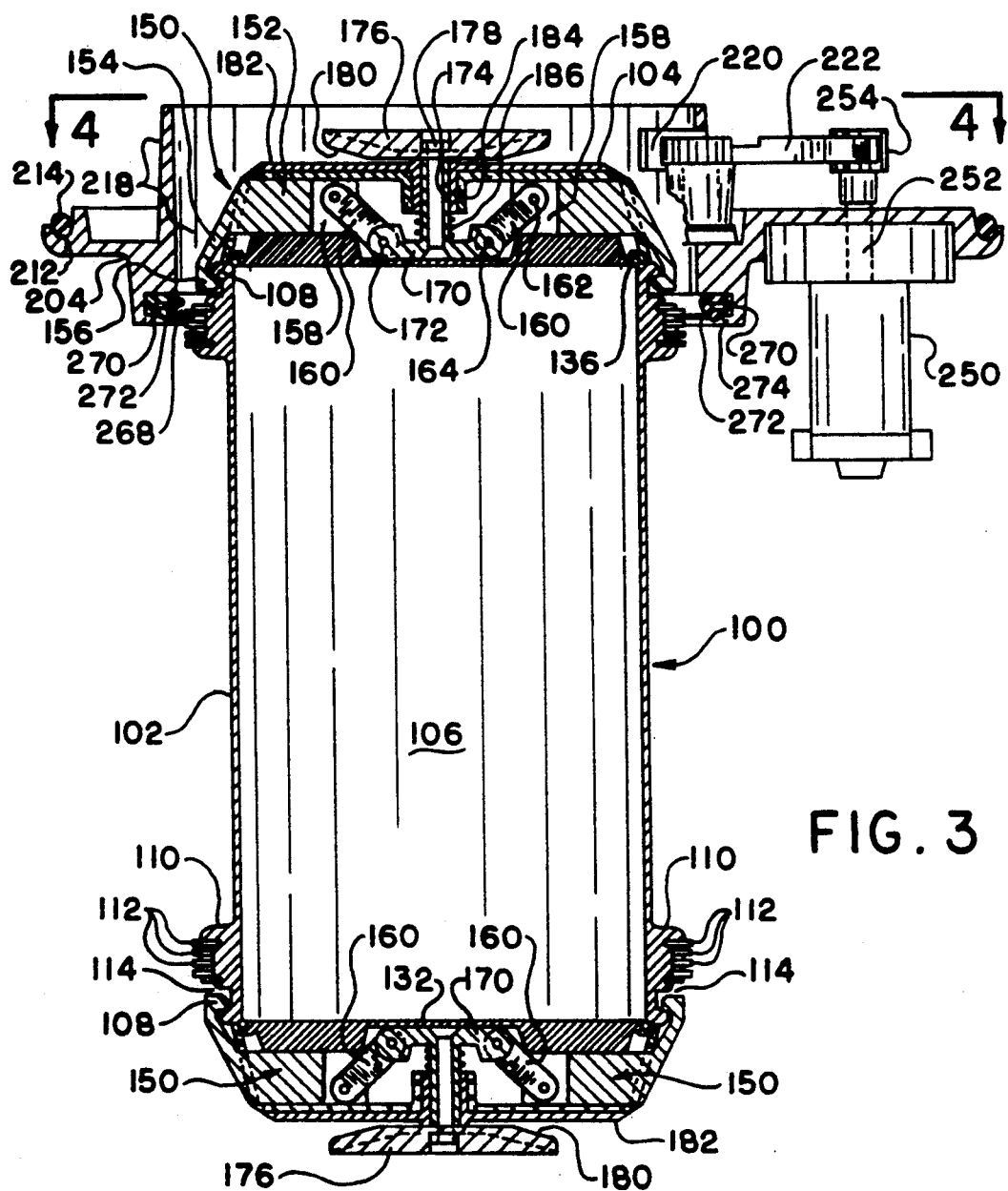
FIG. 3 is a sectional view of a carrier used in the pneumatic transfer system shown in FIGS. 1 and 2 and of a mechanism for removing a cap from a carrier used in such system illustrating preferred embodiments of other aspects of the present invention.
Figure 5:
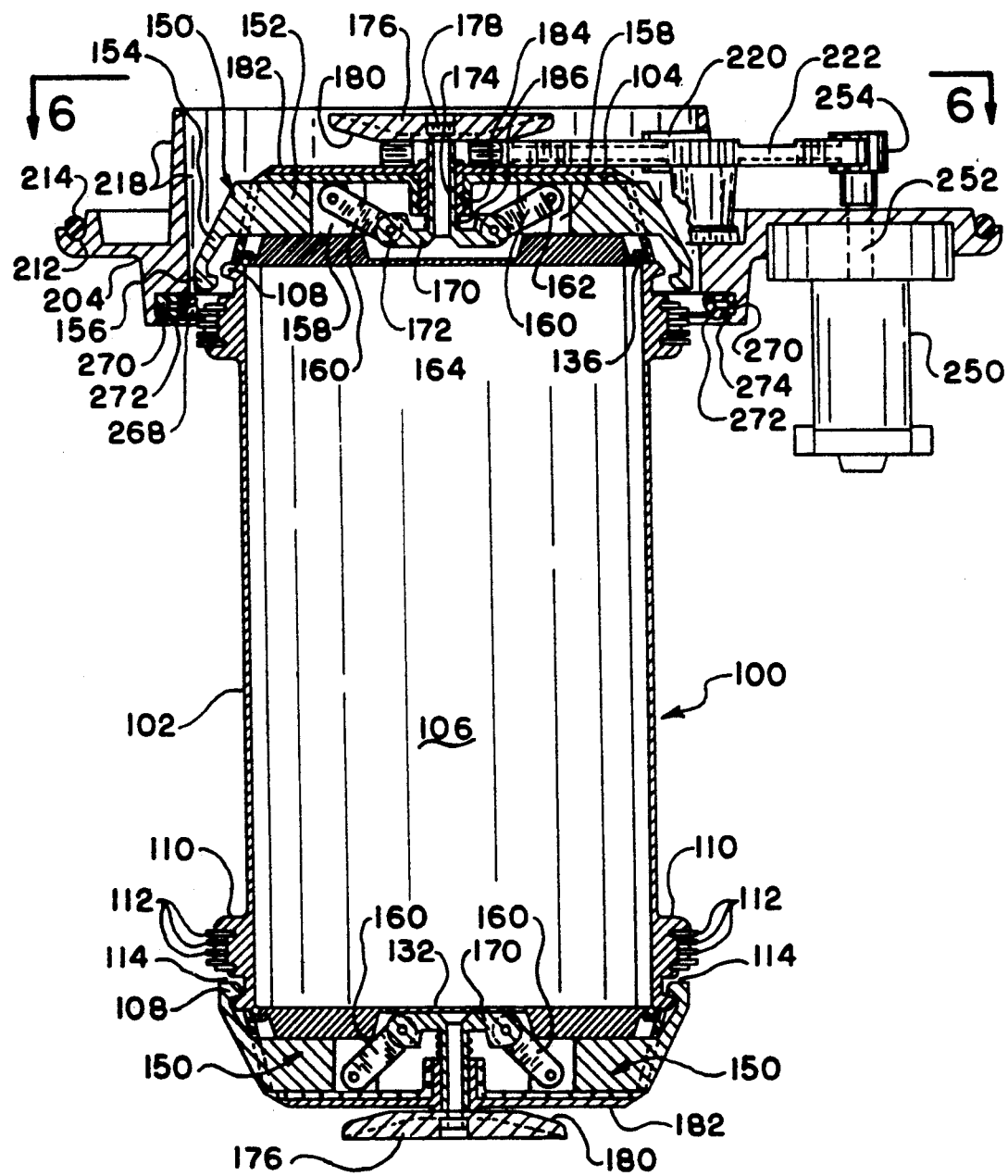
FIG. 5 is a view of the carrier and cap removal system shown in FIG. 3, illustrating the manner in which the cap is detached from the carrier body.

Carrier 100, best seen in FIGS. 3 and 5, is provided to move through passage "P" defined by transfer tube 80 between terminals 40 and 60. Carrier 100 is basically comprised of a tubular carrier body 102 and a pair of identical, removable caps 104, attached to the ends thereof.

Carrier body 102 is cylindrical in shape and defines a cylindrical inner cavity 106 operable to receive articles to be transferred between terminals 40 and 60. Outward extending annular flanges 108 are formed on the external surface of carrier body 102 at the extreme ends thereof. Outwardly extending annular projections 110, which are spaced from flanges 108, are formed on the external surface of carrier body 102. Projections 110 are provided as mountings for conventionally-known annular accelerator rings 112. Accelerator rings 112 have an outer diameter dimensioned to closely match the inner diameter of transfer tube 80. Between flange 108 and projections 110 an annular recess 114 is defined. Carrier body 102 may be formed of plastic or metal, but in the embodiment shown, it is formed of steel and has an overall length of approximately 11¾" and an inner diameter of 6¼".

Figure 3A:
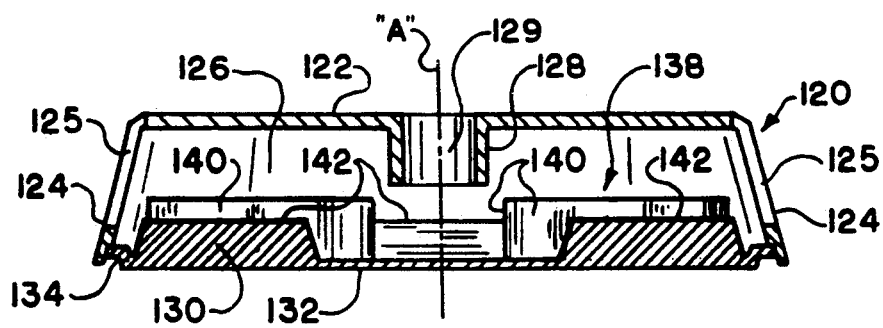
FIG. 3A is an enlarged sectional view of a cap housing and cover from a cap utilized in the system shown in FIGS. 1 and 2.

Caps 104 are generally identical and each includes a cap housing 120, best seen in FIG. 3A, which is generally comprised of a flat, circular plate 122, having an outward flaring sidewall 124 extending to one side thereof. Sidewall 124 is symmetrical about an axis, designated "A" in the drawing and is dimensioned to have a diameter generally corresponding to carrier body 102 wherein the free end of sidewall 124 abuts the ends of carrier body 102 as seen in FIG. 3. Plate 122 and sidewall 124 defines a generally cylindrical inner cavity 126.

A cylindrical boss 128, having a cylindrical bore 129 extending therethrough is formed on plate 122 to be symmetrical about axis A and to project into cavity 126.

A cover 130 is attached to the end of sidewall 124 to close the open end of cover housing 120. Cover 130 is formed to have an external planar surface 132 adapted to face and enclose cavity 106 of carrier body 102. A recess 134 is formed about the periphery of surface 132 to receive an O ring seal 136 (best seen in FIG. 3). O ring seal 136 is dimensioned to engage the end of carrier body 102 and to seal cavity 106 when cap 104 is attached to carrier body 102. Cover 130 includes a plurality of guides 138 projecting into cap cavity 126. Guides 138 are generally U-shaped in cross section and comprised of facing sidewalls 140 disposed on opposite sides of flat guide surface 142. Guide surfaces 142 define linear paths which extend radially outward from axis A. In the embodiment shown, guide surfaces 142 paths are perpendicular to axis A. Each guide 138 is dimensioned to receive a latch element 150 (best seen in FIG. 3) and to confine such latch element 150 between guide surface 142 and plate 122.

Latch elements 150 are generally hook shaped, and include a prismatic latch body 152 which is confined between guide surface 142 and plate 122, an arm portion 154 and a finger or tab 156. Latch member 150 extends through sidewall 124 of cap housing 120 through openings 125 formed therein such that arm portion 154 and fingers or tab 156 are external of sidewall 124. Arm portion 154 and tab 156 are dimensioned such that tab 156 may be received in recess 114 formed between flange 108 and projection 110 on carrier body 102 when cover 130 abuts the end of carrier body 102. A slot 158 is formed in the end of latch element 150. Slot 158 is dimensioned to received an elongated link 160, one end of which is pivotally mounted to latch element 150 by pin 162. The other end of link 160 is pivotally mounted by pin 164 to an actuator 170. Actuator 170 is disposed within cavity 106 of cap 104, and includes a plurality of lugs 172 to which links 160 are pinned, and a cylindrical stem 174 which extends through plate 122 along axis A.

Figure 4:
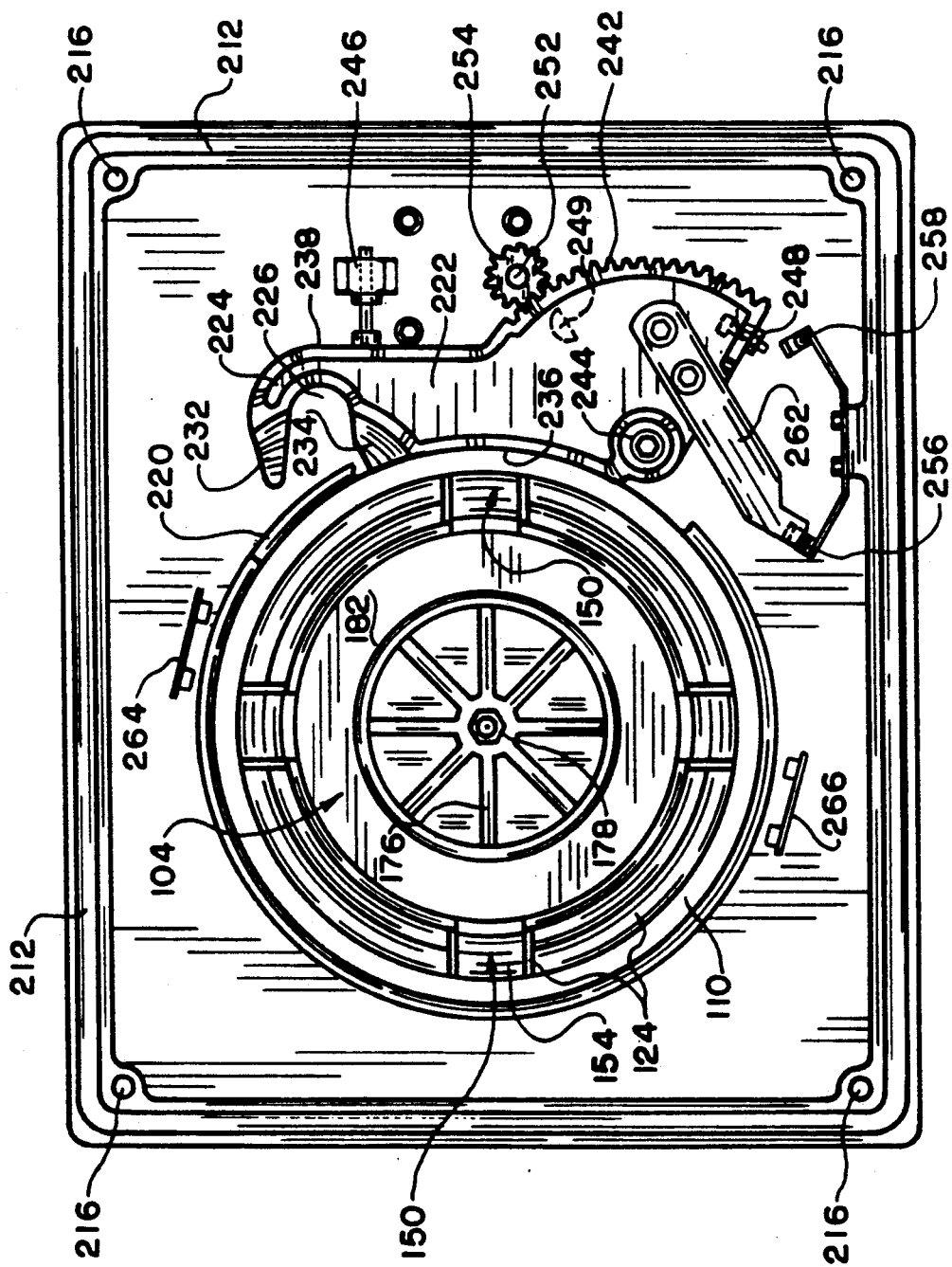
FIG. 4 is a view taken along line 4—4 of FIG. 3.
Figure 6:
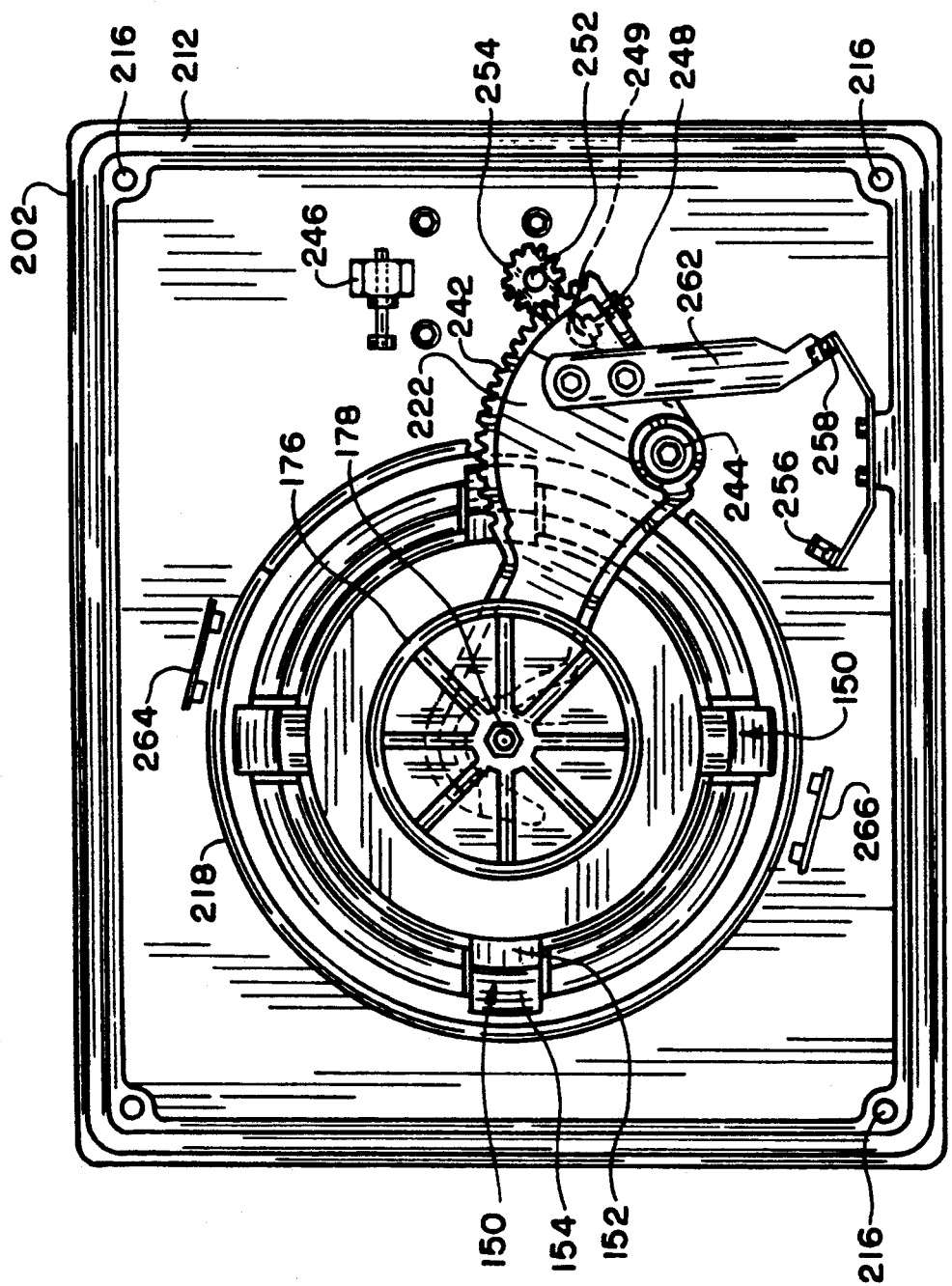
FIG. 6 is a view taken along line 6—6 of FIG. 5.

A circular disk 176 is secured to stem 174 by a conventional fastener 178. Disk 176 includes a slightly conical surface 180 facing cap housing 120. In the embodiment shown, a wear plate 182 of a tough, smooth material having a low surface coefficient of friction is provided between disk 176 and plate 122 of cap housing 120. Plate 182 includes a sleeve 184 dimensioned to be positioned within cylindrical bore 129 between stem 174 of actuator 170 and boss 128 of plate 122 to act as a bushing therefor. A helical spring 186 is disposed about stem 174 of actuator 170 to bias actuator 170 to a first position as shown in FIG. 3. Actuator 170, links 160 and latch elements 150 are respectively dimensioned such that tabs 156 of latch elements 150 are disposed within recess 114 of carrier body 102 when actuator 170 is in a first position (as shown in FIG. 3) wherein latch elements 150 grip flange 108 of carrier body 102 to securely attach cap 104 to carrier body 102. In this respect, actuator 170, latch 150 and links 160 are dimensioned such that actuator 170 is movable axially against spring 186 along axis A to a second position wherein links 160 cause latching elements 150 to move outwardly away from axis A to a position, best shown in FIG. 5, wherein latch elements 150 move outwardly beyond the outer periphery of flange 108. In the embodiment shown, cap 104 includes four latch elements 150 equally spaced from each other about axis A, as best seen in FIGS. 4 and 6. The respective components of cap 104 may be formed of metal or plastic. In the embodiment shown, cap housing 120 is preferably formed of an aluminum alloy, whereas cover 130, latch elements 150, actuator 170 and wear plate 182 are preferably formed of a tough, durable plastic material such as Delrin TM manufactured by DuPont De Nemours EI & Company.

SYSTEM TERMINALS

Figures 7, 7A, 9:
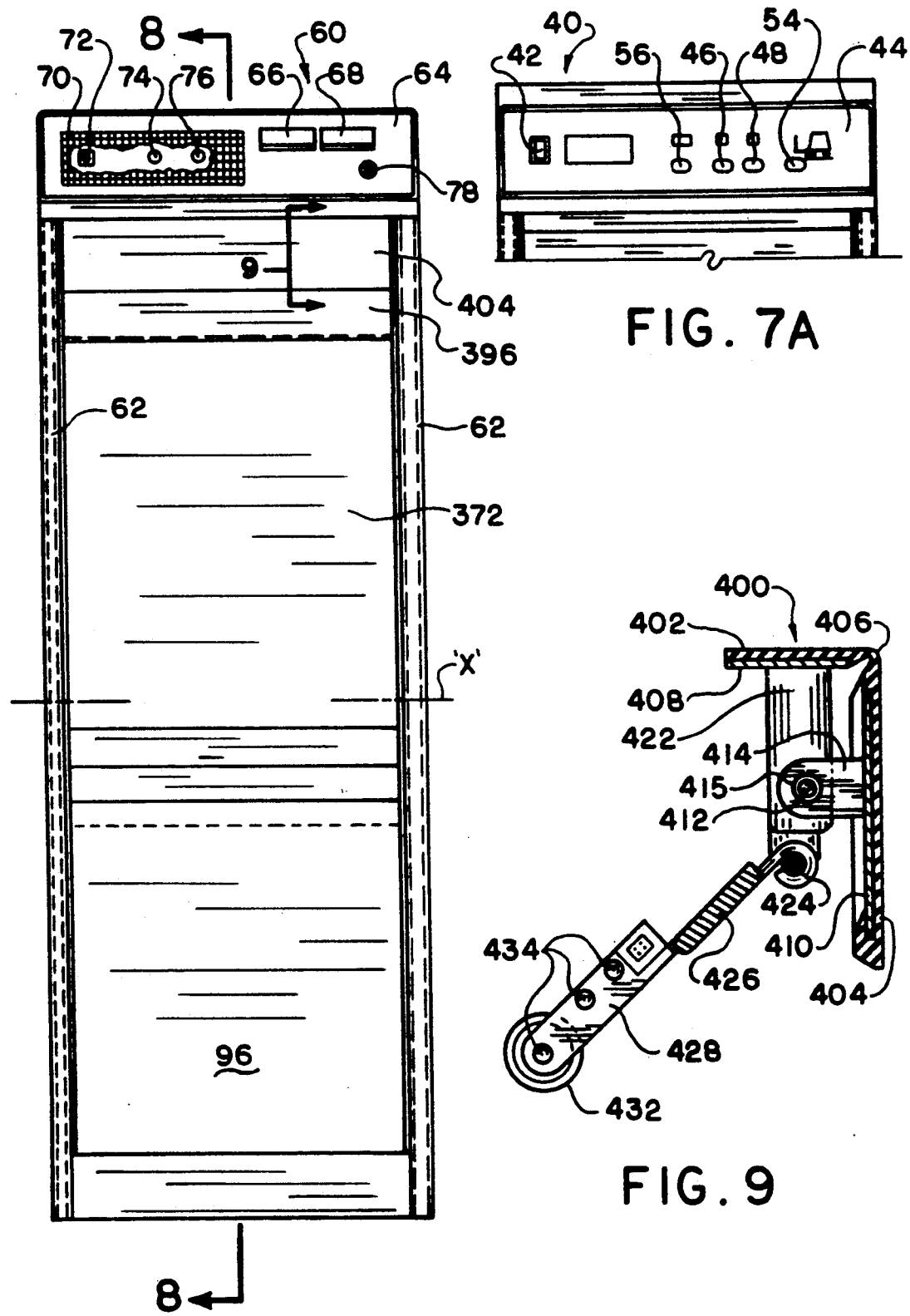
FIG. 7 is a front elevational view of a customer terminal used in the pneumatic transfer system shown in FIGS. 1 and 2.
FIG. 7A is a front elevational view of a control panel from a teller terminal used in the pneumatic transfer system shown in FIGS. 1 and 2.
FIG. 9 is an enlarged sectional view taken along line 9—9 of FIG. 7.
Figure 8:
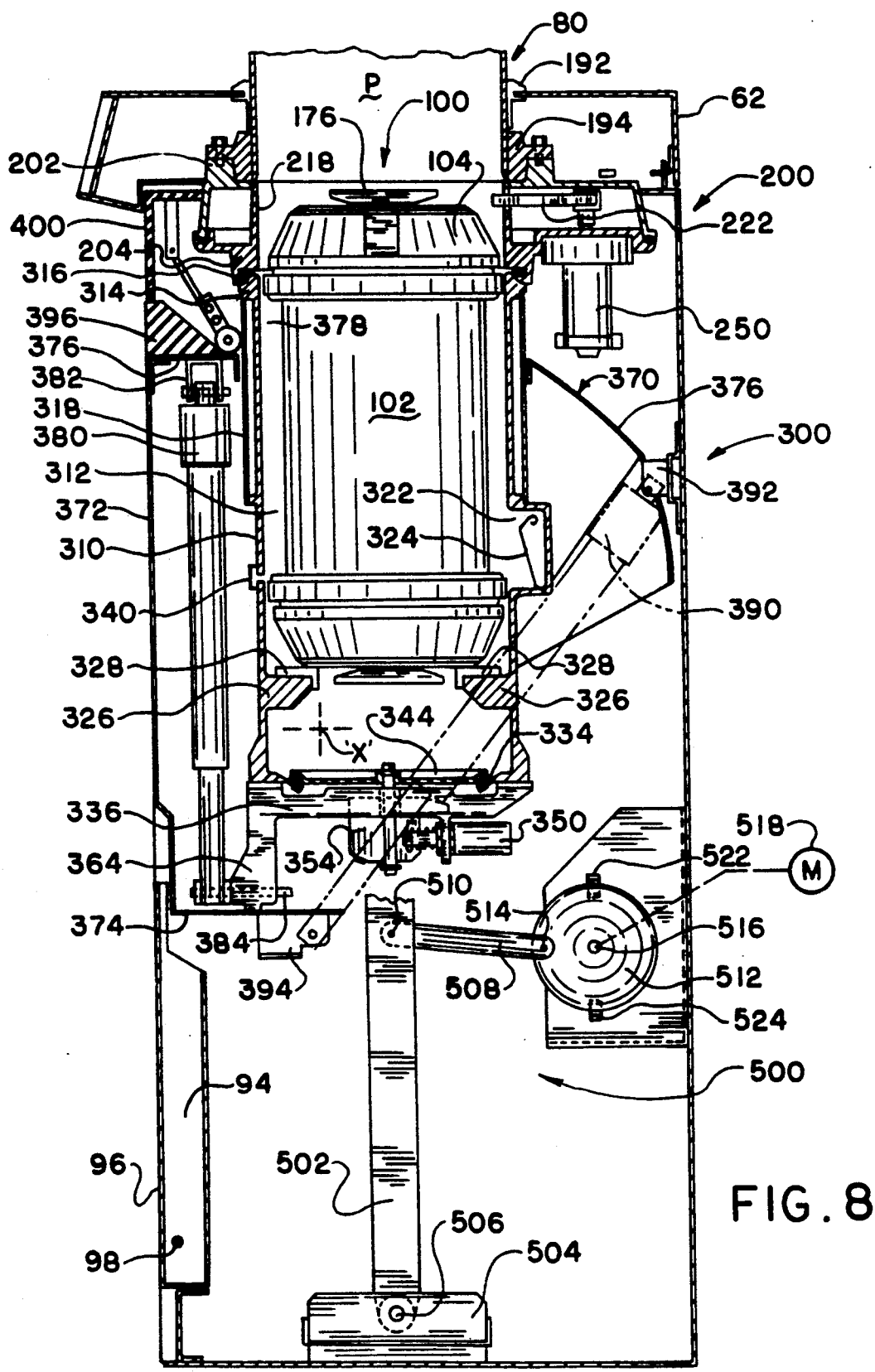
FIG. 8 is a sectional view taken along lines 8—8 of FIG. 7.

Referring now to FIGS. 7 and 8, customer terminal 60 is shown. Terminal 60 is generally comprised of a cabinet or housing 62 dimensioned to contain a cap removing mechanism 200, a carrier receiver assembly 300, and a support assembly 500.

Housing 62 of customer terminal 60 includes a front facing control panel 64 at the uppermost portion thereof. Control panel 64 includes a pair of operation keys 66, 68 for use by a customer to effect operation of system 10. Key 66 is designated as a "SEND" key and key 68 is designated as a "CALL" key, the operations of which shall be described in greater detail below. Control panel 64 also includes a perforated area 70 behind which is mounted a speaker 72 and two ultrasonic sensors 74 and 76, which are shown schematically illustrated in FIG. 7. Sensors 74, 76 are provided to detect objects, specifically automotive vehicles present in front of customer terminal 60. Sensors 74, 76 are each oriented and directed at different elevations to sense different heights of vehicles, illustrated in FIGS. 2A and 2B. In this respect, one sensor is oriented to detect automobiles as illustrated in FIG. 2A, while the other sensor is oriented at a higher elevation to detect vehicles such as vans or trucks as illustrated in FIG. 2B. Control panel 64 also includes a microphone 78 to enable a potential customer to communicate with bank personnel at teller station 14.

Referring now to teller terminal 40, FIG. 7A shows a control panel 44 for such terminal. Importantly, according to the present invention, the housing or cabinet as well as the operative mechanical systems of teller terminal 40 are, in all important aspects, essentially identical to those in customer terminal 60, and only the control panels 44, 64 of teller terminals 40 and customer terminal 60 differ. In this respect, control panel 44, includes operation keys 46, 48 designated as "SEND" and "BRING" respectively. A speaker and microphone (not shown) may be added to panel 42 or may be provided as separate components at teller station 14. Control panel 44 of teller terminal 40 also includes a "power" button 42 designated "POWER", which is operable to control power to system 10, and which enables bank personnel to turn the system "on" and/or "off" during banking hours. Control panel 42 also includes a button 54 designated "EXTEND" and a button 56, designated "DOOR OPEN", the operations of which shall be described in greater detail below.

Referring now to FIG. 8, a sectional view of customer terminal 60 is shown. As indicated above, the operative mechanical components of both teller terminal 40 and customer terminal 60 are essentially identical. The following description of the operative mechanical components of customer terminal 60 applies equally to teller unit 40.

As shown in FIG. 8, transfer tube 80 extends a predetermined distance into housing or cabinet 62 and terminates in cap removing assembly 200. A gasket 192 is provided between transfer tube 80 and housing 62. A tube clamp 194 is attached to the lower end of transfer tube 80. Cap removing assembly 200 includes a generally rectangular plenum formed from an upper plenum section 202 and a lower plenum section 204. Upper and lower plenum sections 202 and 204 are secured together by conventional fastening means not shown and define the plenum cavity 206. Upper plenum section 202 is dimensioned to mate with tube clamp 194 and to be secured thereto by conventional fastening means. Lower plenum section 204, best seen in FIGS. 3-6 and 8 is rectangular and includes a recess 212 extending about the periphery thereof, which recess 212 is dimensioned to receive a seal 214. Seal 214 is provided to form an airtight seal between upper and lower plenum sections 202 and 204 when such sections are secured together. Fastener holes 216 in lower section 204 are provided to receive conventional fasteners (not shown) to secure lower plenum section 204 to upper plenum section 202. Lower plenum section 204 includes an upward projecting cylindrical wall 218 which extends into plenum cavity 206 and which is dimensioned to abut against the lower end of transfer tube 80. Cylindrical wall 218 is dimensioned to have an inner diameter corresponding to the inner diameter of transfer tube 80 and to define a smooth extension thereof. Cylindrical wall 218 includes a generally horizontal slot 220 formed therein, as best seen IN FIGS. 3 and 5. Slot 220 is dimensioned to permit an arm 22, best illustrated in FIGS. 4 and 6, to pass through wall 218 into passage "P" defined by transfer tube 80. Arm 222 includes a hook 224 having an opening 226 dimensioned to receive stem 174 of cap actuator 170 and tapered surfaces 232, 234. Arm 222 also includes a concave edge 236, a flat edge 238 and an arcuate gear 242. Arm 222 is mounted for pivotal rotation about a pin 244 which is mounted to lower plenum section 204 and which is generally parallel to the axis of tube 80. In this respect, arm 222 is movable in a plane which is perpendicular to the axis of transfer tube 80. In the embodiment shown, concave edge 236 is dimensioned to have a radius of curvature corresponding to the radius of curvature of tube 80 and cylindrical wall 218. Pin 244 is positioned relative cylindrical wall 218 such that concave edge 236 may be positioned within slot 220 in alignment with the interior surface of cylindrical wall 218 as best seen in FIGS. 4 and 6 wherein wall 218 in the vicinity of arm 222 has been broken away to illustrate how concave edge 236 becomes a continuation thereof. A first adjustable stop 246 is mounted to lower plenum section 204 to engage flat edge 238 of arm 222 and to establish a first arm position as shown in FIG. 4. A second adjustable stop 248 (shown in FIGS. 4 and 6) is mounted to arm 222 to engage a bumper 249 (shown in phantom FIGS. 4 and 6) which is disposed between arm 222 and lower plenum section 204. Second adjustable stop 248 and bumper 249 are operable to establish a second arm position, as best seen in FIG. 6.

An arm motor 250, best seen in FIGS. 3 and 5, is mounted to the underside of lower plenum section 204. Motor 250 includes a drive shaft 252 which extends through the bottom wall of lower plenum section 204 into plenum cavity 206. A spur gear 254 is mounted on shaft 252 for rotation therewith and meshes with arcuate gear 242 of arm 222. Motor 250 is operable to drive arm 222 between its first position and its second position, wherein arm 222 passes through slot 220 in cylindrical wall 218 such that opening 226 of hooked end 224 is positioned in alignment with the axis of transfer tube 80. According to the present invention, motor 250 includes means capable of detecting current increases which occur when motor 250 experiences an increased load, such as when arm 222 engages first adjustable stop 246 or second adjustable stop 248.

A pair of infrared sensors are mounted to lower plenum section 204 adjacent arm 222. In the embodiment shown, sensors 256, 258 are conventionally known infrared detectors which are typically comprised of an emitter (light source) and a receiver mounted facing each other on legs of a generally U-shaped bracket. Such sensors can detect objects which pass between the legs of the U-shaped bracket thereby breaking the light beam travelling from the emitter to the receiver. In the embodiment shown, sensors 256, 258 are positioned to detect the position of arm 222. In this respect, arm 222 includes a strap 262 extending therefrom having a flag (not shown) positioned to pass between the emitter and receiver of sensors 256, 258, which in FIGS. 4 and 6 are schematically illustrated with the legs of the U-shaped bracket extending upward from the figures. Hereinafter sensors 256, 258 shall be referred to as "arm position sensors 256, 268".

A pair of sensor boards 264, 266 are positioned on opposite sides of cylindrical wall 218 as best seen in FIG. 4. Sensor boards 264, 266 include a plurality of infrared sensors (schematically illustrated) arranged at different elevations to monitor the vertical position of cap 104 within the portion of passage "P" defined by cylindrical wall 218. Apertures (not shown) are provided in cylindrical wall 218 to permit light beams to traverse passage "P" between boards 264, 266. In this respect, the sensors on board 264, 266 are in a staggered vertical positioned alignment to scan the profile of cap 104. Hereinafter, sensors on boards 264, 266 shall be referred to as "cap position sensors 264, 266". The lower most portion of lower plenum section 204 includes an annular recess 268 having a diameter greater than transfer tube 80 and cylindrical wall 218. Recess 268 is dimensioned to receive a seal 270 having a generally conical seal surface 272 which opens downward. Below seal 270, a chamfered edge 274 is provided on lower plenum section 204.

Below cap removing assembly 200, carrier receiver assembly 300 is provided. Carrier receiver assembly 300 includes a carrier receiver 310 which is generally cylindrical in shape and open at both ends. Receiver 310 has an inner diameter dimensioned to correspond to the inner diameter of transfer tube 80 and defines a carrier receiver cavity 312. A flange 314 is formed at the upper end of carrier receiver 310. Flange 314 has a generally conical outer surface 316 dimensioned to operatively mate with surface 272 of seal 270 and with edge 274 of lower plenum section 204. A cylindrical guard 318 is provided to surround the upper portion of carrier receiver 310 as best seen in FIG. 8. A generally rectangular recess 322 is formed in carrier receiver 310 which recess 322 communicates with cavity 312 and includes a locking clip 324 which is mounted for free pivotal movement about a pin at its upper end. A plurality of carrier stops 326 are formed on the inner surface of carrier receiver 310 and project into cavity 312. Pads 328 of resilient material are provided on the upper surface at stops 326. The lower end of carrier receiver 310 includes an inclined annular flange 332 (best seen in FIG. 16A) on which a seal 334 is mounted. Carrier receiver 310 also includes sensing means 340, schematically illustrated in FIG. 8 for detecting the pressure or absence of carrier 100 in cavity 312 of carrier receiver 310. Hereinafter, sensing means 340 shall be referred to as "carrier receiver sensor 340".

Referring now to FIGS. 16A and 16B, the lower end of carrier 310 is secured to a bracket 336 by conventional fastening means not shown. Bracket 336 includes a bore 338 dimensioned to receive a valve stem 342 therethrough. The lower end of valve stem 342 has a flange 346 formed thereon. At its upper end, valve stem 342 is secured to a circular valve plate 344. Valve plate 344 is dimensioned to seat against seal 334 of carrier receiver 310. Referring now to FIGS. 16A and 16B, bracket 336 also includes a lug 348 which is dimensioned to support a solenoid 350. Solenoid 350 includes a movable rod 352 which is attached to a locking element 354 which is pivotally mounted to bracket 338 on pins 355. Locking element 354 includes a strap 356 having a notch 357 dimensioned to surround valve stem 342 and a finger 358 on the upper portion thereof. Locking element 354 is movable between a first non-locking position (as shown in FIG. 16A) wherein valve plate 344 is free to move in an upward direction to a second lock position (not shown) wherein locking element 354 is pivoted to a position wherein notch 357 of strap 356 is disposed above flange 346 on valve stem 342 and finger 358 engages the lower side of valve plate 344 to lock same into a closed position. A spring 362 on solenoid rod 352 biases locking element 354 to its non-locking position. Bracket 336 also includes a downward extending arm 364 having a bore 366 there through.

Carrier receiver 310 is mounted to and surrounded by a carrier receiver chassis 370 which is mounted to the terminal housing 62 for pivotal rotation about a fixed axis designated "X" in FIG. 8. Chassis 370 is basically comprised of a front panel 372, a bottom panel 374 and a top panel 376. Top panel 376 includes a cylindrical opening 378 through which the upper portion of carrier receiver 310 projects. Opening 378 is dimensioned to be only slightly larger than the diameter of guard 318 which surrounds carrier receiver 310. The rear portion of top panel 376 (i.e. the portion of panel 376 near the backside of terminal housing 62) is bent to approximate a curved surface. Front panel 372 of carrier receiver chassis 370 is flat and forms a portion of the outward front face of terminal housing 62.

Carrier receiver 310 is mounted to carrier receiving chassis 370 on a pair of linear guides (not shown) which extend through lugs (not shown) formed on the exterior of carrier receiver 310. The linear guides project between bottom panel 374 and top panel 376 and are fixedly mounted thereto. The guides are disposed to be parallel to the axis of tube 80 and permit reciprocal movement of carrier receiver chassis 370 therealong.

Carrier receiver assembly 300 includes a conventional linear drive motor 380 which is mounted at one end to top panel 376 by means of a bracket 382 and at its other end to bracket 336 by means of a pin 384 extending through aperture 366 of bracket arm 364. As is conventionally known, linear drive motors are operable to translate rotational motion of an internal motor into pre-determined linear motion of a shaft along its axis. In this respect, the shaft of a linear drive motor is movable between an extended position and a retracted position. In FIG. 8, linear drive motor 380 is shown in its retracted position. Linear drive motor 380 is operable to reciprocally move carrier receiver 310 along its linear guides. In this respect, carrier receiver 310 may be moved between a first "elevated" position (shown in FIG. 8) wherein flange 314 of carrier receiver 310 abuts seal 270 of lower plenum section 204 and a second "lowered" position wherein carrier receiver 310 is lowered away from lower plenum section 204. In this respect, carrier receiver 310 is reciprocally movable along its own axis.

Figure 14A:
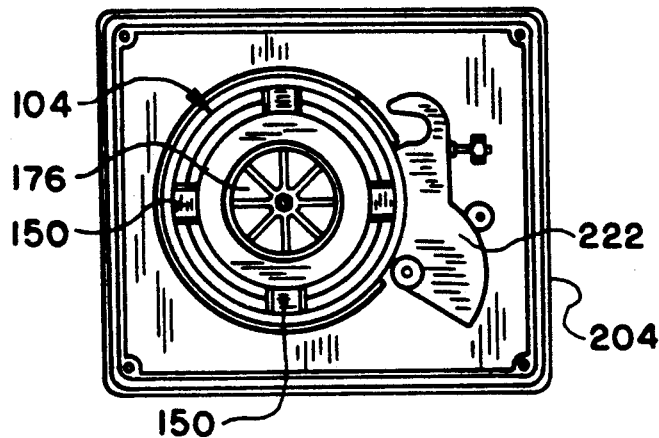
Figure 14B:
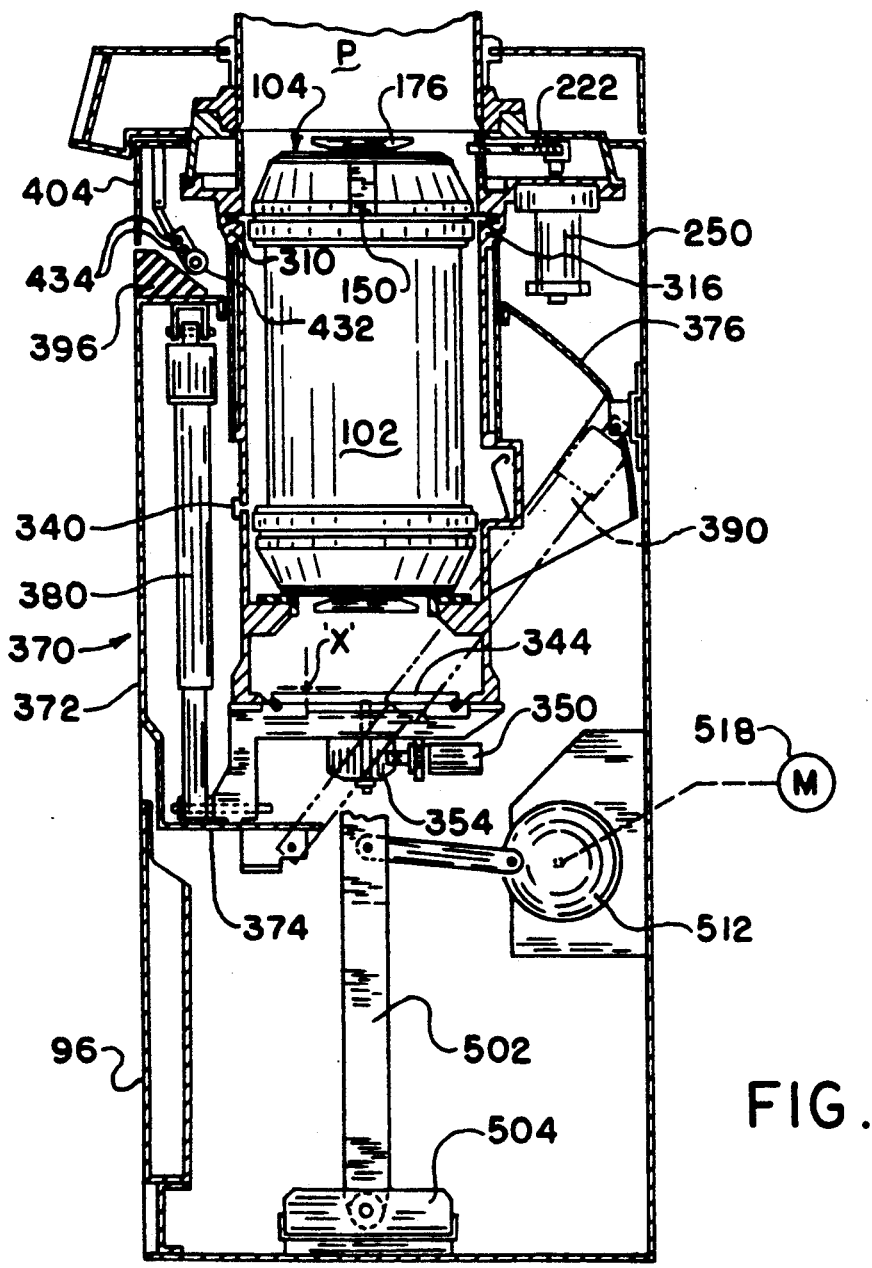
Figure 15A:
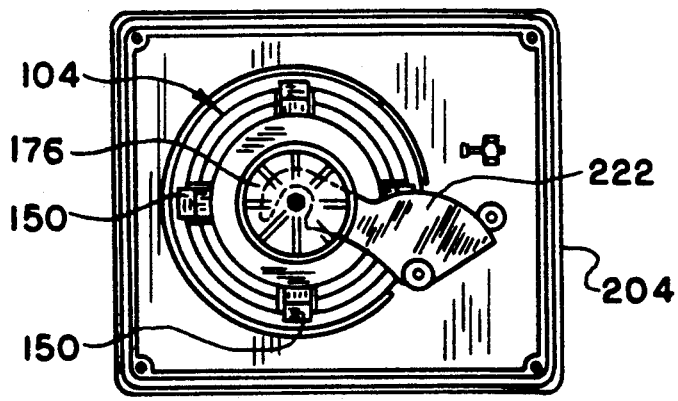
Figure 15B:
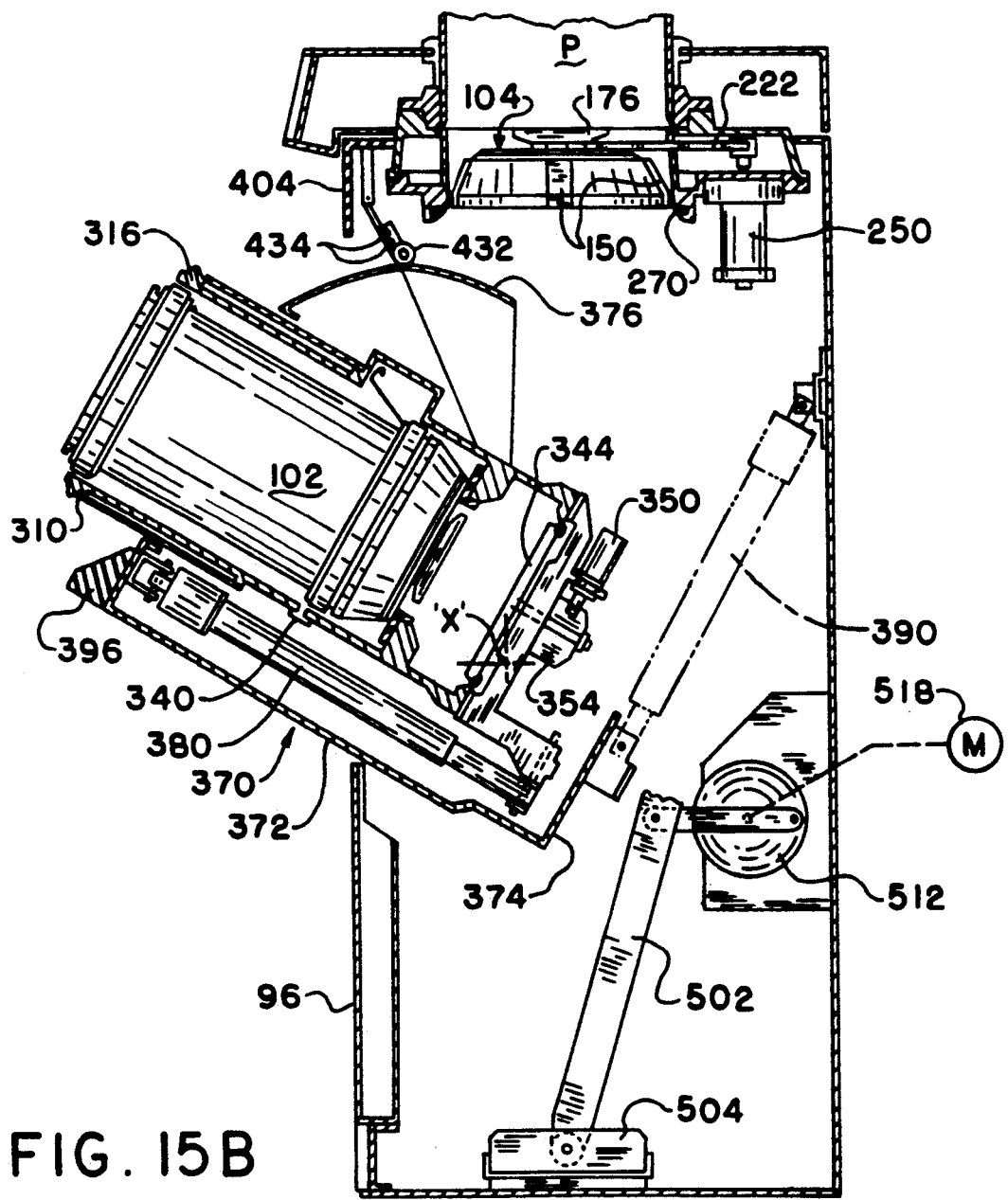

Carrier receiver assembly 300 also includes a second linear drive motor 390 (shown in phantom in FIG. 8). Linear drive motor 390 is mounted at one end to housing 62 by bracket 392 and at its other end to bottom panel 374 of carrier receiver chassis 370 by bracket 394. Linear drive motor 390 is operable to pivot carrier receiver chassis 370 about axis "X" between a first "transfer" position as shown in FIG. 8 wherein carrier receiver 310 is vertically oriented and in alignment with transfer tube 80 and a second "tilted" position wherein carrier receiver chassis 370 is inclined, i.e. tilted, relative to the axis of transfer tube 80 to a position wherein the upper end of carrier receiver 310 is external of terminal housing 62, as best shown in FIG. 14B. Importantly, in this tilted position, linear drive motor 380 is operable to reciprocally move carrier receiver 310 along its axis. Carrier receiver 310 is therefore axially movable along a linear axis which linear axis is itself movable, i.e. pivotable, about a fixed axis "X". In the embodiment shown, linear drive motors 380, 390 are manufactured by Warner Electric as model number SP 24-17A8-06.

A generally triangular block 396 of semi-resilient material is mounted on the forward most edge of top panel 376 of carrier receiver chassis 370. Above block 396 there is provided a generally L-shaped panel member 400 best seen in FIG. 9 which extends across the face of terminal housing 62. According the present invention, panel member 400 is formed of a resilient material such as rubber and includes a horizontal panel 402 and a vertical front panel 404 which together define a flexible "living hinge" at the corner 406 where both panels meet. Panels 402 and 404 include metal reinforcing plates 408, 410 respectively to provide rigidity thereto. Horizontal panel 402 is fixedly mounted to terminal housing 62 wherein vertical panel 404 is free to pivot about corner 406.

According to the present invention, a panel position sensor 412 is disposed within housing 62 adjacent vertical panel 404 as schematically illustrated in FIG. 9. a tab 414 extends from reinforcing plate 408 of vertical panel 404. Tab 414 includes an aperture 415 which is positioned in operable relationship to sensor 412 to enable sensor 412 to detect lateral motion of vertical panel 404. Hereinafter, sensor 412 shall be referred to as "panel sensor 412".

A pair of downward extending support brackets 422 are provided at each end of horizontal panel 402 adjacent to sides of terminal housing 62. A shaft 424 extends between support brackets 422, and a plate 426 is mounted to shaft 424, as shown in FIG. 9. At each end of plate 426 there is provided a bracket 428 to which is mounted a guide wheel 432 and plurality of sensors designated 434. Brackets 428 are positioned such that a guide wheel 432 is disposed on each side of carrier receiver 310. Guide wheels 432 are dimensioned to roll on top panel 376 of carrier receiver chassis 370. Sensors 343 on brackets 428 are positioned to direct beams of light at pre-determined levels above top panel 376 of carrier receiver chassis 370 wherein such sensors are operable to scan across the opening of carrier receiver 310 and the opening of carrier 100. In this respect, sensors 334 are operable to detect objects projecting above the edge of carrier 100. Hereinafter, sensor 434 shall be referred to as "carrier opening sensors 434".

Referring now to FIG. 8 the lower portion of terminal housing 62 includes a support assembly 500. Support assembly 500 is basically comprised of a support beam 502 which may be positioned below carrier receiver chassis 370 to provide structural support thereto during the transfer of carrier 100 between teller terminal 40 and customer terminal 60. Beam 502 is mounted at its lower end to a bracket 504 by pin 506 for pivotal rotation thereabout. The upper end of beam 502 is dimensioned to generally abut the lower end of carrier receiver chassis 370. In FIG. 8, beam 502 is shown with the upper portion thereof broken away to illustrate other components of system 10. In the embodiment shown, beam 502 is formed from a structural H-beam wherein the web (not shown) is removed to enable beam 502 to move past solenoid 350 and locking element 354, in a manner which will be conventionally understood.

An elongated link 508 is pivotally mounted at one end to beam 502 by a pin 510. The other end of link 508 is pivotally mounted to a circular actuator plate 512 by a pin 514. Plate 512 is mounted to a shaft 516 of a reversible motor 518, which is schematically illustrated in FIG. 8. Motor 518 is operable via rotation of plate 512, to move beam 502 from a chassis support position (as shown in FIG. 8) to a non-support position (best seen in FIG. 12B). Sensors 522, 524 are provided adjacent actuator plate 512 to provide an indication of the position of beam 502 by monitoring the position of actuator plate 512. In this respect, as with other sensors used in system 10 and described above, sensors 522, 524 are preferably infrared switches positioned to detect a flag (not shown) on plate 512. Hereinafter, sensors 522, 524 shall be referred to as "support beam position sensors 522, 524".

CONTROL SYSTEM

The physical operations of system 10 are basically controlled by central processing units designated 610, 620 in the drawings, which are located within teller terminal 40 and customer terminal 60 respectively. Each terminal's circuit board is located within a slot 94 defined in a panel 96 located on the front of terminal housing 62 at the lower most portion thereof. Panel 96 is pivotally mounted to terminal housing 62 on a pin 98 to permit easy access thereto.

Figure 10A:
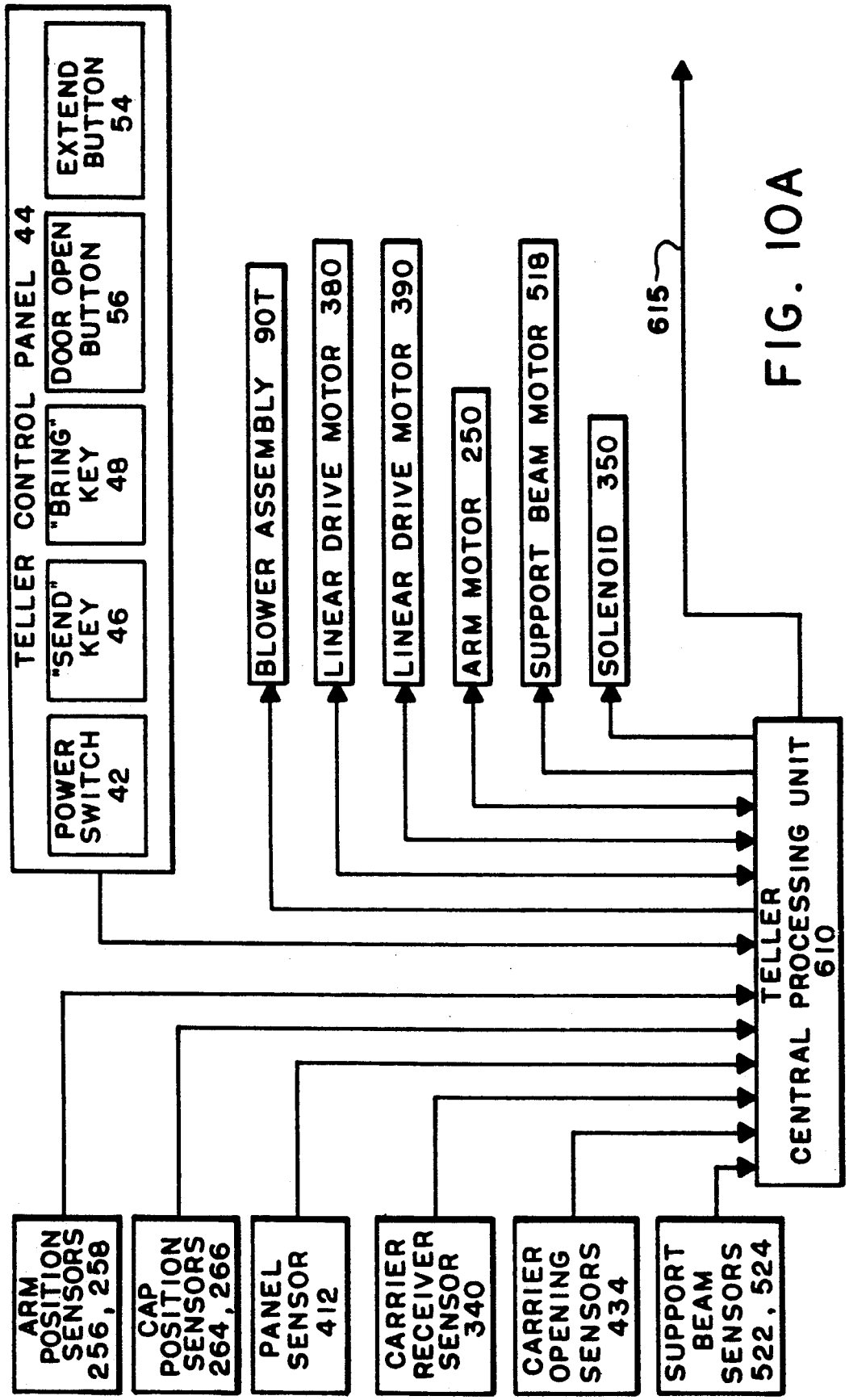
FIGS. 10A and 10B are block diagrammatic representations of the internal electronic control systems for the embodiment shown.
Figure 10B:
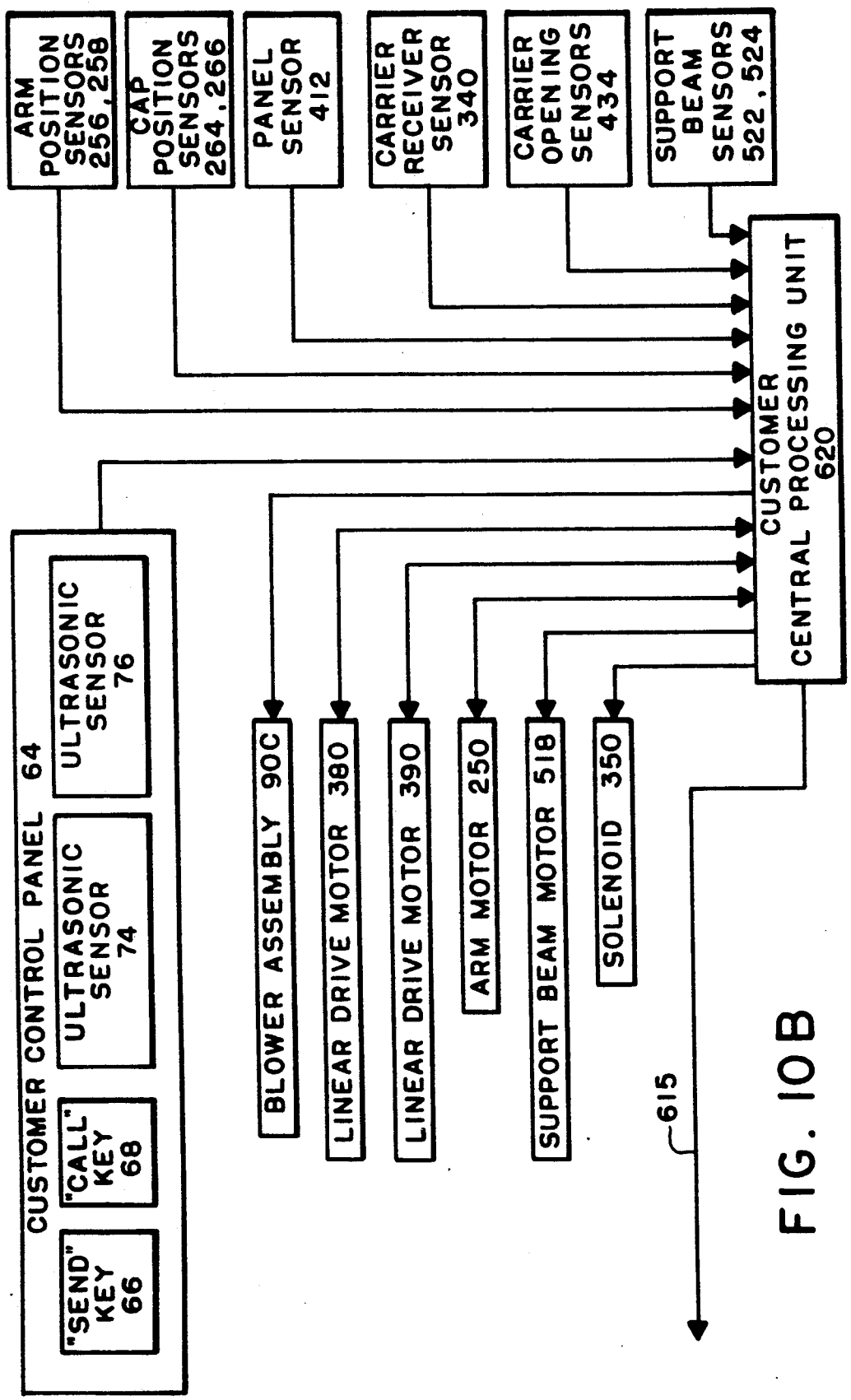

Central processing unit 610, 620 are connected to the operative components of system 10 as schematically illustrated in FIGS. 10A and 10B. Central processing unit 610 and 620 basically control the operations of the respective terminals in which they are located, but are also connected to each other as depicted line 615 to generally monitor the operations of the other terminal in relation to the overall operations of system 10. In this respect, each central processing unit 610, 620 controls the operation of its respective terminal as well as the operation of the overall system 10 by means of a program stored therein.

Inasmuch as both terminals 40 and 60 contain essentially the same components, both central processing units 610, 620 are connected to an arm motor 250, linear drive motors 380, 390, a locking solenoid 350, and a support beam motor 518 to control the operations thereof. In addition, central processing units 610, 620 are connected to blower assemblies 90T, 90C respectively. Central processing units 610, 620 are also connected to cap sensors 264, 266, arm position sensors 254, 256, panel sensor 412, carrier receiver sensor 340, support beam position sensors 522, 524, and carrier opening sensors 434 to receive information therefrom so as to monitor the operations of the respective components. With respect to linear drive motors 380, 390, central processing units 610, 620 can (by internal computation) determine the respective position of these components by internal potentiometers within linear drive motors 380, 390 which provide an indication of rotation of the drive motors and which enable central processing units 610, 620 to monitor and control the respective position of the components moved thereby. In addition to the signal information from these various sensors, teller terminal 40 and customer terminal 60 receive input information from the various operator keys and buttons on control panels 44, 46 respectively. With information from these sources, central processing units 610, 620 can control the operations of teller terminal 40 and customer terminal 60 according to the programs stored therein and according to instructions from a teller or customer.

OPERATION OF PREFERRED EMBODIMENT

Figure 11A:
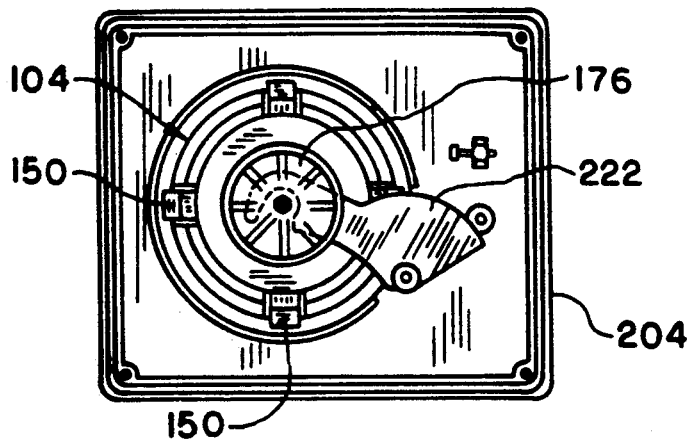
FIGS. 11A through 15B are sectional views of a terminal according to the present invention illustrating the operation thereof.

Referring now to FIGS. 11A through 15B, the operation of system 10 is illustrated. Power to system 10 is initiated by a bank teller by switch 42 on teller terminal control panel 44. When initiated, system 10 will most typically have an initial position wherein carrier 100 is disposed within teller terminal 40 with respective components of teller terminal 40 in positions as illustrated in FIGS. 11A and 11B. In this position, carrier receiver chassis 370 is oriented in its second "tilted" position to expose an opened end of carrier 100 to the bank teller. The cap 104 which is normally secured to carrier body 104 is, in the position shown in FIG. 11B, disposed within cap removing assembly 200. In this respect, cap 104 is maintained within cylindrical wall 218 of lower plenum section 204 by means of arm 222. Arm 222 engages cap disk 176, which maintains actuator element 170 in its second position wherein latching elements 150 are moved radially outward to their second "release" position (best illustrated in FIG. 5). Actuator arm 222 maintains cap 104 within passage "P", and maintains latching elements 150 in their carrier release position.

Figure 11B:
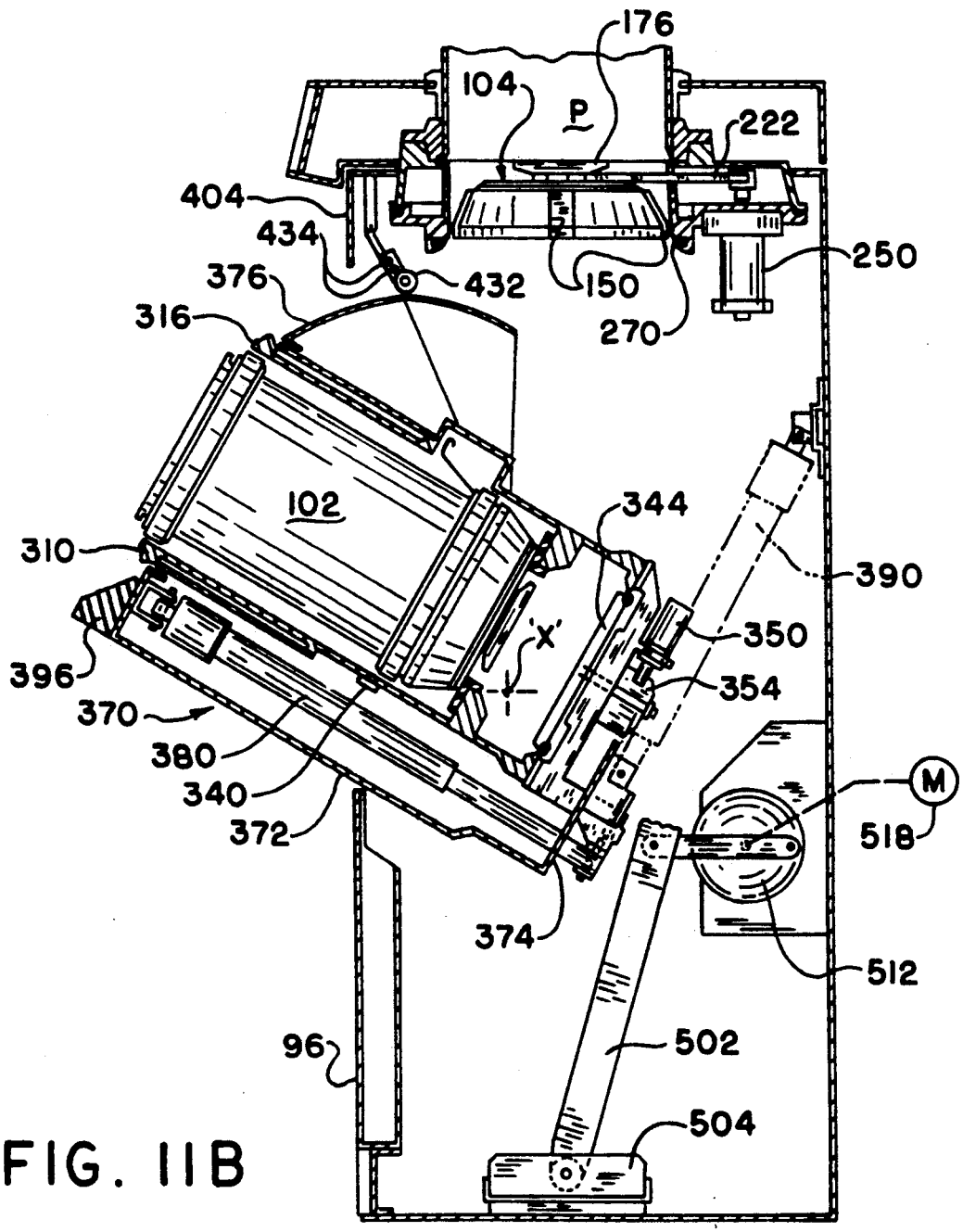

In the position shown in FIG. 11B, linear drive motor 380 is extended which positions receiver carrier chassis 370 in its second "lowered" position. Second linear drive motor 390 (shown in phantom in FIG. 11B) is in its retracted position wherein chassis 370 is pivoted to its second "tilted" position about axis "X". Support beam 502 is in its second position to enable free rotation of carrier receiver chassis 370. Locking clip 324 within recess 322 of receiver carrier 310 is, under the influence of gravity, positioned as shown in FIG. 11B wherein the lower end thereof engages projection 110 on carrier body 102 to prevent removal of carrier 100 from carrier receiver 310.

Figure 12A:
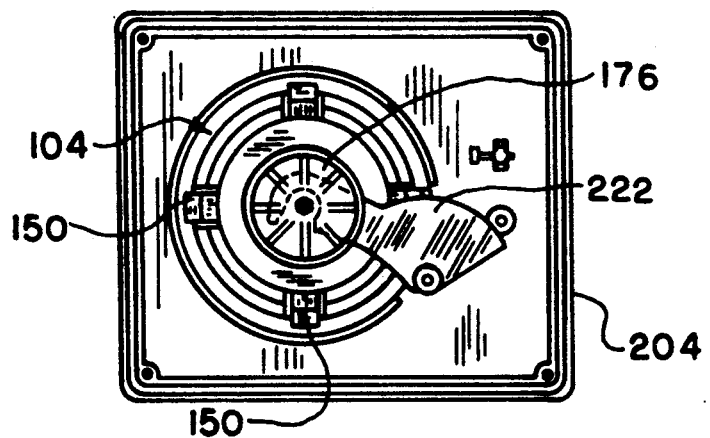
Figure 12B:
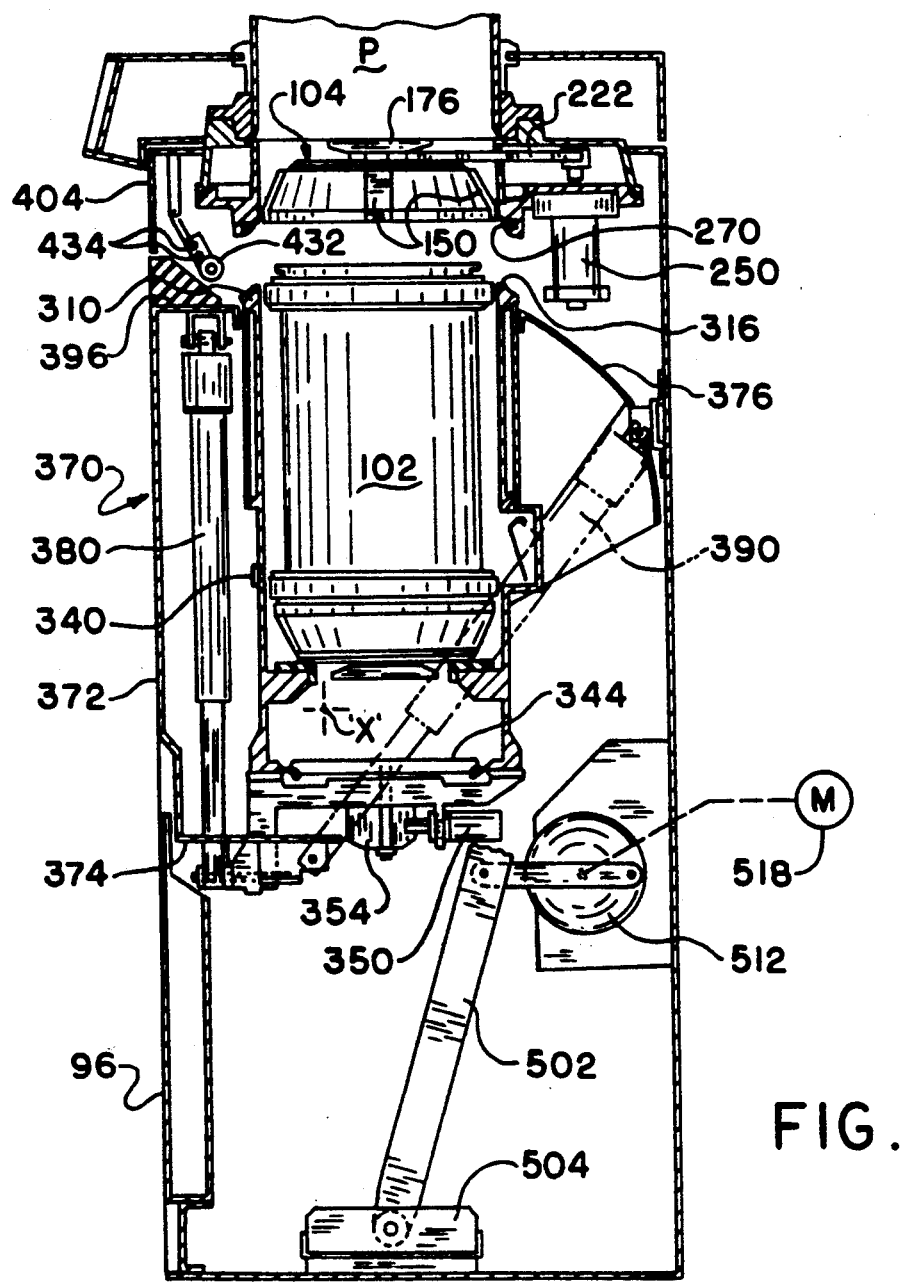

In the position shown in FIG. 11B, cavity 106 of carrier 100 is accessible by a bank teller to insert or remove articles therefrom. Transfer of carrier 100 from teller terminal 40 to customer terminal 60 may be initiated by the bank teller using operation key 46, designated "SEND" on control panel 44 of teller terminal 40, or transfer may be initiated by a customer using operation key 68, designated "CALL" on control panel 64 of customer terminal 60. Signals from either of the foregoing operation keys are conveyed to teller central processing unit 610 which based upon such input provides output signals to the operative components of terminal 40 to convey carrier 100 to customer terminal 60. In this respect, teller central processing unit 610 instructs second linear drive 390 to move to its extended position, which movement causes carrier receiver chassis 370 to pivot about access "X" from its "tilted" position shown in FIG. 11B to its "aligned" position as shown in FIG. 12B wherein carrier 100 is generally aligned along the access of passage "P" of transfer tube 80. During the rotation of carrier chassis 370 about axis "X", sensors 434 mounted behind movable panel 400 scan across the opened end of carrier 100 to insure that no articles project above the edge thereof. Items extending above the edge of carrier 100 could affect replacing cap 104 on carrier 100. If sensors 434 detect an object above the upper edge of carrier 100, central processing unit 610 reverses the direction of linear drive motor 390 thereby moving carrier receiver chassis 370 back to its "tilted" position, indicating to the bank teller or a customer that an obstruction exists within carrier 100. If no obstruction is detected by sensors 434, carrier receiver chassis 370 is permitted to rotate to its "aligned" position best seen in FIGS. 12A and 12B. During rotation of carrier receiver chassis 370, central processing unit 610 also monitors panel position sensor 412. In this respect, in the event that an object, or perhaps the hands or fingers of the bank teller, become caught between resilient block 396 on carrier receiver chassis 370 and movable panel 400, deflection of panel 400 causes tab 414 to move relative to stationary position sensor 412 which "trips" sensor 412, indicating to central processing unit 610 of movement of movable panel 400. If such signal is received by central processing unit 610, linear drive motor 390 is instructed to reverse direction to again move carrier receiver chassis 370 to its "tilted" position. Thus, according to the present invention, both terminals 40, 60 include a safety feature to prevent inadvertent injury to bank personnel and/or customers.

Figure 13A:
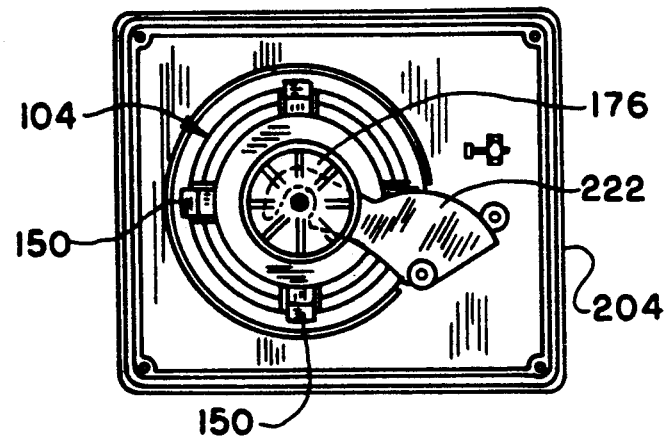
Figure 13B:
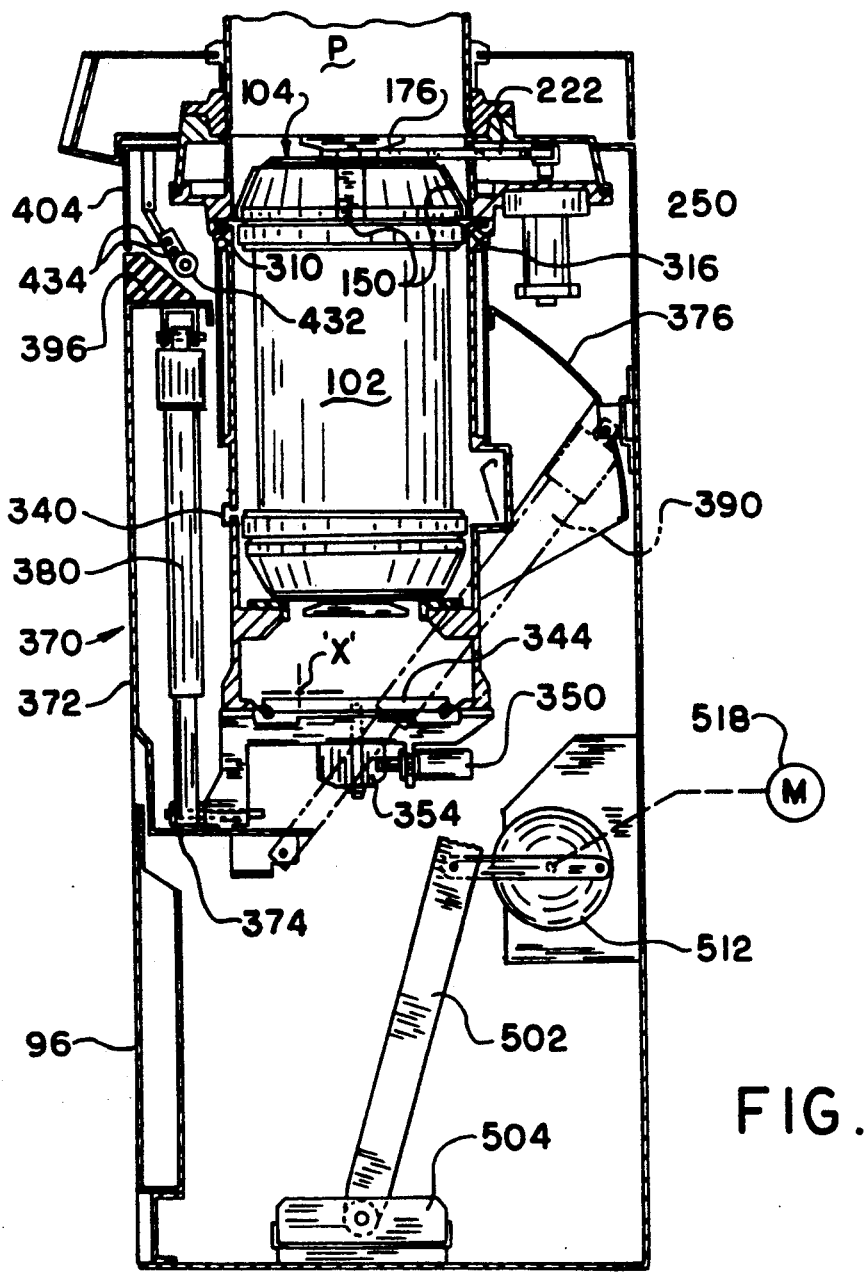

If neither of the foregoing events occur, carrier receiver chassis is permitted to move to its "aligned" position, shown in FIG. 12B wherein carrier 100 is aligned with passage "P" of transfer tube 80. The position of carrier receiver chassis 370 is monitored by central processing unit 610 by its control off the linear displacement of linear drive motor 390 and by equating such displacement with an internal program. When disposed in its "aligned" position, central processing unit 610 instructs linear drive 370 to retract, thereby moving carrier receiver 310 to its "elevated" position and therewith carrier 100 into engagement with cap 104, as illustrated in FIG. 13B. In this respect, conical surface 316 on flange 314 of carrier receiver 310 acts in conjunction with conical surface 274 of lower plenum section 204 to align carrier body 102. As indicated above, cap 104 is in its "release" position. Once engaged with cap 104, central processing unit 610 activates arm motor 250 to move arm 222 from its second position as shown in FIG. 13A to its first position as shown in FIG. 14A, wherein arm 222 is withdrawn from passage "P". As arm 222 is withdrawn from passage "P", it releases disk 176 which enables actuator 170 to move to its first normal position whereby latching elements 150 move to their "attached" position gripping flange 108 on carrier body 102. Cap 104 is thus secured to carrier body 102. Central processing unit 610 also initiates motor 518 to move support beam 502 into its support position below carrier receiver chassis 370, as shown in FIG. 14B.

With cap 104 attached to carrier body 102, carrier 100 is transferred from teller terminal 40 to customer terminal 60 by initiating exhaust blower assemblies 90T and 90C. According to operation of the present invention, both exhaust blower assemblies 90T and 90C are initially activated simultaneously. Exhaust blower assembly 90T located above teller terminal 40 is activated as a booster to evacuate air more rapidly from transfer tube 80. Exhaust blower assembly 90T is deactivated the moment the trailing end of carrier 100 has exited teller terminal 40, which moment is established by using cap position sensors 264, 266. In this respect, teller central processing unit 610 monitors cap position sensor 264, 266 to determine when carrier 100 exited or has "cleared" teller terminal 40. Blower assembly 90T is then deactivated by teller central processing unit 610. At this point, with carrier 100 given an initial boost upward, exhaust blower assembly 90C causes carrier 100 to move through transfer tube 80 to customer terminal 60. As a vacuum is drawn in front of carrier 100, air is permitted into passage "P" behind carrier 100 through the opening at the lower end of carrier receiver 310. In this respect, locking element 354 is in an open position in teller terminal 40 to permit valve plate 344 to move upward wherein air is allowed to flow thereby into transfer tube 80 behind carrier 100. Conversely, during transfer of carrier 100 to customer terminal 60, locking element 354 in customer terminal 60 is in its locked position to seal valve plate 344 against seal 334. As carrier 100 moves through transfer tube 80 it eventually passes exhaust blower assembly 90C, at which point it is above customer terminal 40. Once past exhaust blower assembly 90C, the speed of carrier 100 rapidly decreases as it encounters a cushion of air in front of it. In this respect, system 10 as disclosed herein is extremely airtight as can be seen from the numerous seal arrangements provided throughout the system, and, as indicated above, valve plate 344 in customer terminal 60 is locked against seal 334 of carrier receiver 310 by locking element 354. This creates an airtight chamber below carrier 100 which decreases the speed thereof. Carrier 100 settles into customer terminal 60 under the influence of gravity on a cushion of air, carrier 100 slowly dropping into customer terminal 60 as air within the tube system below carrier 100 slowly "blows by" or "bleeds by" accelerator rings 112. Once carrier 100 has settled into carrier receiver 310 of customer terminal 60, carrier receiver sensor 340 within carrier receiver 310 of customer terminal 60 indicate to central processing unit 620 of customer terminal 60 that carrier 100 has arrived wherein central processor 620 deactivates exhaust blower assembly 90C. At the same time, exhaust blower assembly 90C is deactivated, customer teller processing unit 620 activates support beam motor 518 to shift support beam 502 to its second non-supporting position.

Within customer terminal 60, carrier 100 is oriented in a position as shown in FIG. 14B wherein the lower end of carrier 100 rests on pads 328 within carrier receiver 310. Pad 328 are disposed within carrier 310 such that when carrier 100 is resting thereon and carrier 310 is in its "elevated" position abutting lower plenum section 204, cap 104 is disposed slightly above the proper position for operative engagement with arm 222 of cap removing assembly 200. In this respect, cap position sensors 264, 266 scan cap 104 (specifically scan the profile thereof) to determine when cap 104 is in a proper position relative to arm 222, and indicate to customer central processing unit 620 that cap 104 is not in the proper position. In response thereto, customer central processing unit 620 causes linear drive motor 380 to extend thereby lowering the elevation of carrier receiver chassis 370 and carrier 100 with cap 104. Cap position sensors 264, 266 continually monitor cap 104 until it reaches the proper position, at which point cap position sensors 264, 266 advise customer central processing unit 620 that cap 104 has arrived at the proper position, wherein customer central processing unit 620 deactivates linear drive motor 380 to stop movement of carrier receiver chassis 370 and in turn cap 104.

Importantly, according to the present invention, for each sequence of removing and replacing cap 104 on carrier 100, customer central processing unit 620 temporarily stores in its internal memory the position of carrier receiver chassis 370 when cap 104 is properly aligned with arm 222. In other words, when the proper position for removing cap 104 is established by lowering carrier receiver chassis 370, this position is stored within customer central processing unit 620 to ensure carrier receiver chassis 370 is returned to the same position to enable proper mating between cap 104 and carrier body 102. This operation (i.e. sensing and storing the position of carrier receiver chassis 370) is repeatedly performed for each cap removal sequence. As noted previously, central processing units 610, 620 within teller terminal 40 customer terminal 60, respectively can monitor the position of carrier receiver chassis 370 by monitoring the extension of linear drive motor 380 using the internal potentiometer thereof. The present invention thus provides means for monitoring the position of carrier 100 relative to cap removing assembly 200 and means for repositioning or adjusting carrier 100 to ensure proper alignment with cap removing assembly 200.

When properly aligned with cap removing assembly 200, customer central processing unit 620 activates arm motor 250 to move arm 222 from its first position to its second position wherein tapered surfaces 232, 234 on hook end 224 engage conical surface 180 of disk 176 thereby causing disk 176 to move upward. This movement causes actuator 170 to move from its first position to its second position best illustrated in FIG. 5. Simultaneously, actuator 170 causes latch elements 150 to move radially outward thereby releasing carrier body 102. The position of the respective components of customer terminal 60 at this point in the sequence of motion is best illustrated in FIGS. 13A and 13B.

Arm position sensor 258 indicates when arm 222 is in its second position releasing and holding cap 104. Customer central processing unit 620 then causes linear actuator 380 to extend thereby lowering carrier receiver chassis 370 to a position best shown in FIG. 12B. When carrier receiver chassis 370 has reached its lowest position, customer central processing unit 620 causes linear drive motor 390 to retract thereby pivoting carrier receiver chassis 370 about axis X to a position best shown in FIG. 11B.

As indicated above, customer terminal 60 includes ultrasonic sensors 74, 76, each of which is oriented and directed at different elevations. Ultrasonic sensors 76, 78 are operable to detect the presence of objects, i.e. vehicles, using ultrasonic sound waves which are bounced off the object. As is well known, the return waves indicate the presence of an object and can also be used to determine the distance of the object from the sensors. In the embodiment shown, one sensor is directed at an elevation which will detect the presence of a car or small vehicle in front of customer terminal 60, while the other sensor is directed at an elevation to detect larger vehicles such as vans or trucks as best illustrated in FIGS. 2A, 2B. According to the present invention, if a car is detected in front of customer terminal 60, customer central processing unit 620 causes carrier receiver chassis 370 to be pivoted about axis X to a position which will provide the customer convenient access to carrier 100, as shown in FIG. 11B. In the event that ultrasonic sensors 74, 76 detect a van or truck, customer central processing unit 620 causes carrier receiver chassis 370 to pivot about axis X to a different angle of inclination slightly greater than that shown in FIG. 11B wherein the opened end of carrier 100 is oriented at a more convenient angle relative to the larger vehicle. More importantly, when ultrasonic sensors 76, 78 detect a large vehicle, customer central processing unit 620 also causes linear drive motor 380 to retract to move carrier receiver chassis 370 its "elevated" position wherein carrier 100 "extends" outward from customer terminal 60 toward the customer's vehicle. In other words, to accommodate larger vehicles wherein the driver is at an elevated position, the present invention upon detecting such vehicles reorients the angle of inclination of carrier receiver chassis 370, and extends carrier 100 closer to the vehicle and the customer. This "extend" feature may also be used with smaller vehicles. To this end, a teller at teller terminal 40 may cause carrier chassis 370 to "extend" outward toward a smaller vehicle by utilizing operation key 49 designated "EXTEND" on control panel 44 of customer terminal 40. After a customer has placed articles or financial documents within carrier 100 by hitting operation key 66, designated "SEND" on control panel 64 of customer terminal 60, carrier 100 is returned to teller terminal 40 through the sequence previously described.

The present invention thus provides a transfer system capable of transferring relatively large loads, which system is extremely compact in relation to the size of the carrier due primarily to the structure thereof and the efficiency of the system. More importantly, the present invention provides a system wherein the carrier is reciprocally movable along an axis which itself is pivotal. This feature, together with the ability to control the position of the carrier along such axis, provides a system which can sense the nature of the vehicle before it and which can adjust the position of the carrier as presented to such vehicle. In addition, it provides a system wherein the respective position of the operative components can be monitored and adjusted to ensure proper alignment of the components.

While the present invention has been described with respect to a pneumatic transfer system for use in banking operations, it will be appreciated that the present system has wider, broader application and may be used in any application wherein point-to-point transfer articles is desired. Moreover, while the present invention has been described with respect to a captive cylindrical carrier, aspects of the present invention find advantageous application in non-cylindrical pneumatic systems as well as pneumatic transfer systems utilizing non-captive carriers.

Still further, while the present embodiment shown has been generally described with carrier receiver chassis 370 as having two "tilted" positions (responsive to the size of the vehicle sensed by ultrasonic sensor 76, 78)

and with carrier receiver 310 having two positions (i.e. an "elevated" and a non-elevated position), it will be appreciated that embodiment shown is not limited in operation to these positions. In this respect, central processing units 610, 620 are capable of positioning carrier 100 in an infinite number of positions axially and angularly. Accordingly, the embodiment shown may be programmed to sense the size of a vehicle in front of customer terminal 60, as well as its distance therefrom, and locate the open end of carrier 100 at an optimum convenient position in response thereto.

These and other modifications and alterations will become apparent to those skilled in the art after reading of the present specification. It is intended that all such modifications and alterations be included insofar as they come within the scope of the patent as claimed or the equivalence thereof.

Having described the invention, the following is claimed:

1. A pneumatic tube system for a banking operation comprising:
   a teller terminal;
   a customer terminal;
   a cylindrical tube defining a carrier path connecting said terminals;
   a cylindrical captive carrier for passage through said tube between said terminals, having an internal cavity;
   a pair of generally identical removable caps at the distal ends of said carrier;
   carrier receiving means enclosed within each of said terminals for receiving said carrier; means for reciprocally moving said carrier receiving means along a pre-determined axis and for angularly moving said pre-determined axis relative to said tube;
   cap removing means within each of said terminals for removing a cap from and replacing a cap on, one end of said carrier while said carrier is aligned with said tube;
   sensing means associated with said customer terminal for sensing the height of a vehicle in front of said customer terminals;
   control means responsive to said sensing means for controlling the orientation of said pre-determined axis relative to said tube and the axial position of said carrier receiving means along said pre-determined axis.

2. A system as defined in claim 1 wherein each of said caps includes a plurality of latch elements movable between an attached position wherein said cap is secured to said carrier and a release position wherein said latch elements are disengaged from said carrier, said latch elements being reciprocally movable along paths which radiate from a central axis.

3. A system as defined in claim 1 wherein said predetermined axis is movable between a first position wherein said carrier in said carrier receiving means is aligned with said path and a second position wherein said carrier in said carrier receiving means is inclined relative to said path with the upper end of said carrier within said carrier receiving means is external of said terminal.

4. A system as defined in claim 1 wherein said cap removing means is disposed adjacent said path and includes an arm reciprocally movable from a first position outside said path to a second position within said path wherein said arm operatively engages a cap and releases said cap from said carrier.

5. A system as defined in claim 4 wherein said arm is movable in a plane generally perpendicular to said path.

6. A system as defined in claim 5 wherein
   said cap includes an external actuating element operatively connected to said latching elements, said actuating element having a first position and a second position, said latch elements being in said attached position when said actuator element is in said first position and being in said release position when said actuator element is in said second position, and
   said arm includes surface means operable to move said actuator to said second position when said arm engages said cap.

7. A pneumatic tube system comprising:
   a pair of terminals;
   an overhead tube connecting said terminals;
   a captive carrier for passage through said tube, said carrier having an internal cavity for carrying articles and removable caps at the distal ends thereof enclosing said cavity;
   carrier receiving means within each of said terminals for receiving said carrier along a predetermined longitudinal axis;
   drive means for moving said carrier receiving means relative to said tube wherein said drive means comprises means for reciprocally moving said carrier receiving means axially along said predetermined axis and means for angularly moving said predetermined axis relative to said tube; and
   cap means associated with each of said terminals comprising means for removing cap from one end of said carrier, permitting access to said carrier cavity, and replacing said cap to permit transfer of said carrier through said tube.

8. A system as defined in claim 7 further comprising:
   sensing means associated with at least one of said terminals for detecting the presence of objects adjacent said terminal;
   control means responsive to said sensing means for controlling said carrier receiving means, said control means operable to orient said pre-determined axis and position said carrier along said axis in response to said sensing means.

9. A system as defined in claim 7 wherein said cap means is operable to remove said cap while said carrier is stationary and aligned with said tube.

10. A system as defined in claim 7 wherein said caps each include a plurality of latch elements movable between an attached position wherein said cap is secure to said carrier and a release position wherein said latch elements are disengaged from said carrier, said latch elements being movable along paths which radiate from a central axis.

11. A pneumatic tube system comprising:
    a pair of terminals;
    an overhead tube connecting said terminals defining a carrier path between said terminals;
    a captive carrier having a removable caps at each end thereof, each of said caps including a plurality of latch elements movable between an attached position wherein said cap is secured to said carrier and a release position wherein said latch elements disengage from said carrier and said cap may be removed therefrom, and an exposed actuator for moving said latching elements from said attached position to said release position, cap means within said terminal for interacting with said actuator and for removing a cap from said carrier when said carrier is in a first position aligned with said carrier path, and means for moving said carrier axially to a second position wherein the opened end of said carrier is external of said terminal.

12. A system as defined in claim 11, wherein said cap means is disposed adjacent an upper end of said terminal and includes an operator arm which intersects said carrier path defined by said tube, said arm engaging said actuator on said cap when said carrier is within said terminal to release said cap from said carrier.

13. A system as defined in claim 11 further comprising a carrier receiver within each of said terminals for receiving said carrier therein.

14. A system as defined in claim 11 wherein said means for moving said carrier includes a carrier receiver dimensioned to receive said carrier, said carrier receiver operable to reciprocally move said carrier axially along a pre-determined axis which is angularly movable relative to said tube.

15. A system as defined in claim 11 wherein said tube and said carrier are cylindrical.

16. A pneumatic tube system comprising:

a pair of terminals;

an overhead tube connecting said terminals;

a hollow carrier dimensioned for passage through said tube, said carrier having an inner cavity dimentioned to carry articles therein and means for accessing said cavity;

carrier receiving means within at least one of said terminals for receiving said carrier;

drive means for moving said carrier receiving means relative to said tube wherein said drive means comprises means for reciprocally moving said carrier axially along a linear path and means for angularly moving said linear path relative to said tube, said carrier receiving means having a first position wherein said linear path is in axial alignment with said tube and at least one other position wherein said linear path is angularly oriented relative to said tube;

sensing means associated with said at least one of said terminals for sensing a vehicle for determining the position of an operating occupant; and control means responsive to said sensing means for controlling said carrier receiving means, said control means comprising means for moving said linear path relative to said tube between said first position and said other position and for selectively positioning said carrier along said linear path when in said other position.

17. A system as defined in claim 16 wherein said carrier includes at least one removable cap at one end thereof, and said system further comprising cover removing means within said terminal operable to remove and replace said cap on said carrier.

18. A system as defined in claim 16 wherein said carrier is captive within said at least one terminal.

19. A system as defined in claim 16 wherein overhead tube is cylindrical.

20. A system as defined in claim 16 wherein:

said carrier is captive in said system and includes removable caps at both ends thereof, and each of said terminals including said carrier receiving means, and means for automatically removing and replacing a cap from one end of said carrier.

21. A system as defined in claim 16 wherein said sensing means includes ultrasonic frequency sensors.

22. A pneumatic type system for a banking operation comprising:

a teller terminal;

a customer terminal;

a tube connecting said terminals;

a carrier movable through said tube between said terminals, and pneumatic means for conveying said carrier between said terminal; said customer terminal including:

carrier receiver means for receiving said carrier when it enters said customer terminal, drive means for reciprocally moving said carrier receiver along a predetermined linear path, and for angularly moving said predetermined linear path relative to said tube, said carrier receiver having a position wherein said carrier is in axial alignment with said tube, sensing means for sensing a vehicle for determining the position of an operating occupant of said vehicle in the vicinity of said customer terminal, and control means responsive to said sensing means for controlling said drive means, said control means comprising means for angularly orienting said path and positioning said carrier receiver on said path relative to said vehicle.

23. A system as defined in claim 22 wherein said tube is cylindrical and said carrier is captive in said system.

24. A pneumatic tube system comprising:

a pair of terminals, an overhead tube connecting said terminals, a captive carrier for passage through said tube, said carrier having an internal cavity for carrying articles and removable caps at the distal ends thereof enclosing said cavity, a carrier receiver within each of said terminals for receiving said carrier, and a drive assembly for reciprocally moving said carrier receiver axially along a predetermined axis which is angularly movable relative to said tube, said carrier receiver having a first position wherein said predetermined axis is aligned with the longitudinal axis of said tube such that said carrier may be transferred between said tube and said carrier receiver and a second position wherein said predetermined axis is angularly oriented relative to the longitudinal axis of said tube, said drive assembly comprising means for reciprocally moving said carrier receiver along said predetermined axis when in said first position and said second position.

* * * * *